US008335797B2

(12) United States Patent
Sakai

(10) Patent No.: US 8,335,797 B2
(45) Date of Patent: Dec. 18, 2012

(54) DOCUMENT MANAGEMENT SERVER, DOCUMENT MANAGING METHOD, AND PROGRAM

(75) Inventor: Minoru Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1251 days.

(21) Appl. No.: 11/511,515

(22) Filed: Aug. 29, 2006

(65) Prior Publication Data

US 2007/0047006 A1 Mar. 1, 2007

(30) Foreign Application Priority Data

Aug. 30, 2005 (JP) ................. 2005-250265
Aug. 30, 2005 (JP) ................. 2005-250266

(51) Int. Cl.
G06F 7/00 (2006.01)
G06F 17/30 (2006.01)
(52) U.S. Cl. .................................... 707/784
(58) Field of Classification Search .......... 707/784, 707/999.009
See application file for complete search history.

(56) References Cited

U.S. PATENT DOCUMENTS

| 6,654,746 | B1 * | 11/2003 | Wong et al. | 1/1 |
| 7,310,635 | B2 * | 12/2007 | Tucker | 1/1 |
| 7,441,277 | B2 * | 10/2008 | Burges et al. | 726/29 |
| 7,788,237 | B2 * | 8/2010 | Voronov et al. | 707/695 |
| 2005/0289234 | A1 * | 12/2005 | Dai et al. | 709/229 |
| 2006/0248129 | A1 * | 11/2006 | Carnes et al. | 707/204 |

FOREIGN PATENT DOCUMENTS

| JP | 2002-91882 | 3/2002 |
| JP | 2002-175300 | 6/2002 |
| JP | 2002-330251 | 11/2002 |
| JP | 2003-515199 | 4/2003 |
| JP | 2004-171571 A | 6/2004 |
| JP | 2004-303100 A | 10/2004 |

OTHER PUBLICATIONS

Japanese Office Action mailed on Oct. 26, 2010 directed to Japanese Application No. 2005-250265; (2 pages).

* cited by examiner

Primary Examiner — Alexey Shmatov
(74) Attorney, Agent, or Firm — Morrison & Foerster LLP

(57) ABSTRACT

An access control list, indicating contents of user operatable authorization, is set in an electronic file or folder stored in a document management server. The server receives from MFP a registering electronic file, location information of the electronic file and destination information including a notification destination user to which registration is notified. If no notification destination user is registered in ACL, the server transmits the notification of registration and the electronic file to PC of the notification destination user and receives a notification of electronic file reception from PC. The server sends the user in ACL a notification of notification destination user's reception of electronic file. In the case of multiple received electronic files and destination information, the server creates an acknowledgement mail describing link destination information specifying storage locations of electronic files, and transmits the mail to a transmission destination specified by destination information according to a designation signal.

10 Claims, 36 Drawing Sheets

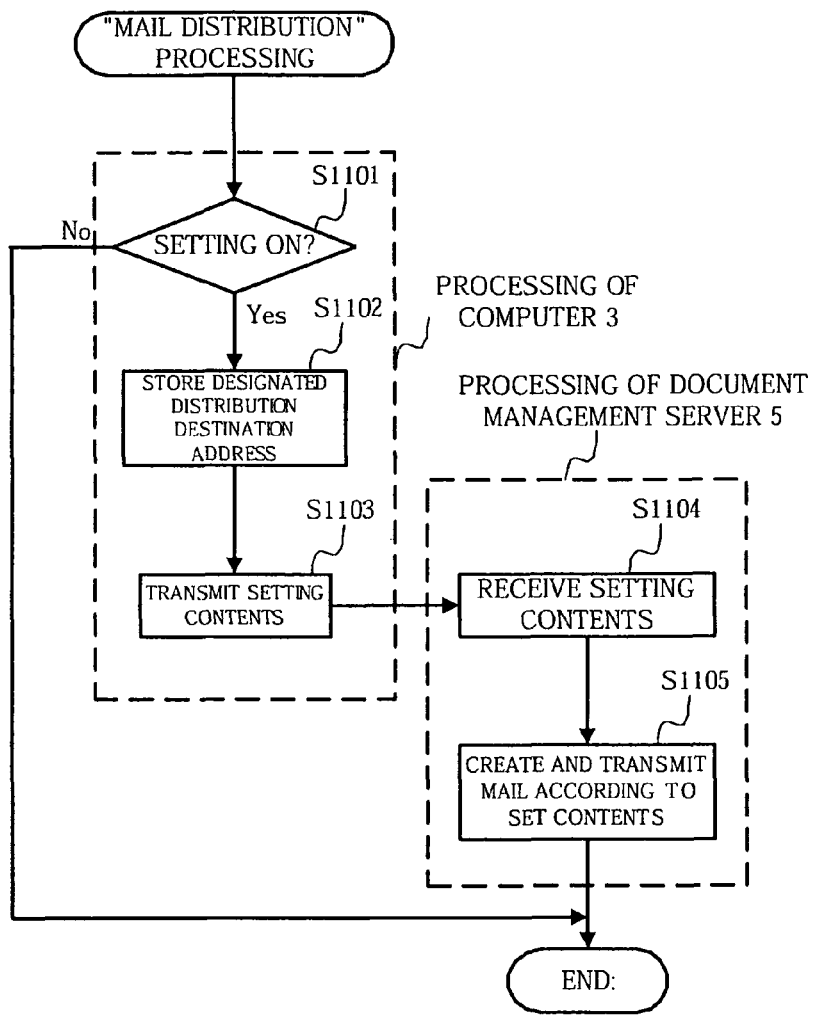

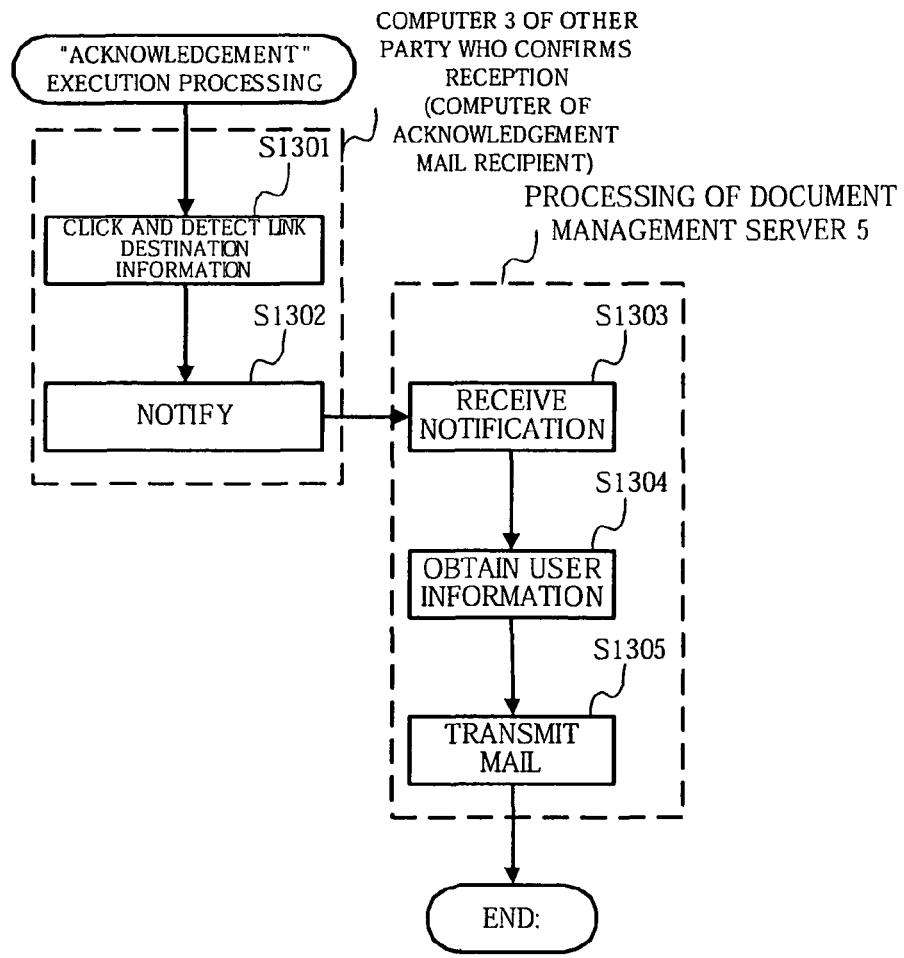

FIG. 15A  Touch Here

FIG. 15B

| DOCUMENT MANAGEMENT | SCANNER |
|---|---|
| COPY | PRINTER |
| FAX | |

FIG. 15C

| REGISTER | REFERENCE |
|---|---|
| PRINT | EXTRACT |
| DELETE | |

FIG. 15D

| D | |
|---|---|
| PASSWORD | |
| | |

FIG. 15E

BY WHICH WAY DO YOU REGISTER?

| SCANNER | STORAGE MEDIA |

FIG. 15F

BY WHICH WAY DO YOU REGISTER?

| DOCUMENT MANAGEMENT SERVER | STORAGE MEDIA |

FIG. 15G

OPTION SETTING
DO YOU SHARE REGISTERED FILE?

| YES | NO |

FIG. 15H

OPTION SETTING
DO YOU CARRY OUT FILE HISTORY MANAGEMENT?

| YES | NO |

FIG. 15I

OPTION SETTING
DO YOU CARRY OUT MAIL DISTRIBUTION?

| YES | NO |

FIG. 15J

OPTION SETTING
PLEASE INPUT MAIL ADDRESS OF DISTRIBUTION DESTINATION.

| NUMBER | ELECTRONIC FILE NAME OR ELECTRONIC FOLDER NAME | TRANSMISSION DESTINATION USER NAME |
|---|---|---|
| 1 | ELECTRONIC FILE B OF GROUP FOLDER G2 | USER002, USER003 |
| 2 | ELECTRONIC FILE C OF GROUP FOLDER G2 | USER003, USER004, USER005 |
| ⋮ | ⋮ | ⋮ |

| SOURCE tkana@ric.net.com |
|---|
| TRANSMISSION DESTINATION admini@ric.net.com |
| SUBJECT: RECEPTION COMPLETION MAIL |
| THIS IS INFORMATION MAIL OF RECEPTION COMPLETION.<br><br>MR./MS. TKANA HAS REFERRED TO THE FOLLOWING DOCUMENT.<br><br>DOCUMENT NAME: MINUTES<br>FILE NAME: MINUTES<br>VERSION: 0<br>FILE ATTRIBUTE<br><br>http:///ric/papa/mama/e1234/f2234 |

FIG. 31B

| SOURCE admini@ric.net.com |
|---|
| TRANSMISSION DESTINATION USER002@ric.net.com<br>USER003@ric.net.com |
| SUBJECT: RECEPTION COMPLETION MAIL |
| THIS IS INFORMATION MAIL OF RECEPTION COMPLETION.<br><br>MR./MS. TKANA HAS REFERRED TO THE FOLLOWING DOCUMENT.<br><br>DOCUMENT NAME: MINUTES<br>FILE NAME: MINUTES<br>VERSION: 0<br>FILE ATTRIBUTE<br><br>http:///ric/papa/mama/e1234/f2234 |

FIG. 34

| TRANSMISSION DESTINATION :abc@abc.com |
|---|
| SUBJECT: ACKNOWLEDGEMENT MAIL |
| THANK YOU FOR USING RICOH 1STBIZ.<br>THIS IS INFORMATION MAIL FROM MR./MS. A<br>THE FOLLOWING DOCUMENT HAS BEEN REGISTERED<br>OR UPDATED.<br><br>  SERVER: RICOH ADOPTION STORAGE<br>  FOLDER PATH: /MY FOLDER/<br>  DOCUMENT NAME:TEST1.doc  TEST2.doc<br><br>1stBIZ://ICMNLSDB/RMDB/PART2/%D3%esEE38<br>1stBIZ://ICMNLSDB/RMDB/PART2/%D3%esEE39 |

FIG. 36

| TRANSMISSION DESTINATION abc@abc.com |
|---|
| SUBJECT: RECEPTION COMPLETION MAIL |
| THANK YOU FOR USING RICOH 1STBIZ.<br>THIS IS INFORMATION MAIL OF RECEPTION COMPLETION<br>MR./MS. B HAS REFERRED TO THE FOLLOWING<br>DOCUMENT.<br><br>SERVER: RICOH ADOPTION STORAGE<br>FOLDER PATH: /MY FOLDER/<br>DOCUMENT NAME:TEST1.doc  TEST2.doc |

DOCUMENT MANAGEMENT SERVER, DOCUMENT MANAGING METHOD, AND PROGRAM

BACKGROUND OF THE INVENTION

1. Field of the Invention

The present invention relates to a document management server and document managing method, and program.

2. Description of the Related Art

In recent years, document management servers for collectively managing documents stored in various devices have been proposed and put to practical use.

For example, Unexamined Japanese Patent Application KOKAI Publication No. 2004-171571 discloses a document management system having a configuration in which an application apparatus such as an image processing apparatus (for example, MFP (Multi-Function Peripheral)) and a document management server are connected to each other via a network. According to this document management system, a user can operate the MFP and manage (refer to, display, print, register, delete) documents within authorization given to the MFP.

Moreover, Unexamined Japanese Patent Application KOKAI Publication No. 2004-303100 discloses a document management server having a function in which when data of an electronic file stored in the document management server is updated by an information terminal apparatus connected over a network (for example, Internet, LAN (Local Network), and the like), a notification mail indicating the update is transmitted to registrants registered in advance.

However, in conventional, the notification can be transmitted to the registrant registered in updated electronic file in advance, but the notification cannot be transmitted to the user who is not registered therein. For example, a case is assumed where access permission is set such that only a valid user can register the electronic file in the document management server using the information terminal apparatus installed in the office. If the valid user makes a request for registration of the electronic file outside the office (for example, a business destination), it is difficult for the user to check whether the electronic file that the user requested to register is really registered in the document server.

Moreover, in conventional, even when a certain document is registered in the document management server, the document cannot be notified to a predetermined party. Accordingly, even when the document with self address (namely, destination of the other party) is registered in the document management server, there is a possibility that the user will not notice that that the document is registered.

In this case, a case can be considered where the document management server notifies the transmission destination of registration of the certain document. However, if the notification is made for each registered document, an increase in amount of traffic will occur to increase a communication load.

SUMMARY OF THE INVENTION

In view of the aforementioned circumstances, it is an object of the present invention to provide a document management server, document managing method, and program suitably capable of notifying registration of an electronic file irrespective of access permission to make it possible for a user to easily know that the electronic file is registered with no excessive load.

In order to attain the above object, a document management server according to a first aspect of the present invention includes an electronic file storage section that stores an electronic file and an electronic folder; a reception section that receives an electronic file, location information that designates an electronic folder for storing the electronic file, and destination information that designates a user of the other party to which registration of the electronic file is notified; a registration section that registers the electronic file received by the reception section in the electronic folder indicated by the location information received by the reception section; a user list storage section that stores a user list that associates a user accessible to the electronic file in the electronic folder with access permission that the user has for each electronic folder stored in the electronic file storage section; a first transmission section that transmits a notification, indicating that the electronic file received by the reception section is registered by the registration section, to a user indicated by the user list set in the electronic folder that stores the electronic file registered by the registration section; and a second transmission section that transmits a notification, indicating that the electronic file received by the reception section is registered by the registration section, and the electronic file registered by the registration section to a user, who is not included in the user list set in the electronic file that stores the electronic file registered by the registration section, among users of the other party indicated by the destination information received by the reception section.

The transmission section may transmit a notification, indicating that the electronic file received by the reception section is registered in the electronic file storage section, and the electronic file received by the reception section or an electronic file obtained by converting the electronic file in a predetermined format to the user of the other party indicated by the destination information.

The document management server may further includes a second user list storage section that stores second destination information that designates a second user of the other party to which a notification, indicating a user operation, is sent when the user operation is performed for each electronic folder stored in the electronic file storage section wherein the reception section receives a response from the user of the other party; and wherein the second transmission section transmits a notification, indicating that the electronic file received by the reception section is registered in the electronic file storage section, to the second user of the other party when the user of the other party is included in information stored in the second user list storage section.

The second transmission section may transmit a notification, indicating that the electronic file received by the reception section is registered in the electronic file storage section, and information indicating a location where the electronic file received by the reception section is registered, to the second user of the other party indicated by the second destination information.

The reception section may include a transmission information reception section that receives a file, user identification information for specifying a sender of the file, and transmission destination that specifies a transmission destination of the file from an external section; an association storage section that stores the file received by the transmission information reception section, the user identification information, and the transmission destination information to be associated with one another; an acknowledgment mail creation section that creates an acknowledgment mail where storage location information that specifies each storage location of multiple files stored in the association storage section is described at once in connection with the multiple files; an acknowledgement mail transmission section that transmits the acknowledgment mail created by the acknowledgement mail creation section to the transmission destination specified by the transmission destination information; and a file transmission section that receives a request for transmitting the file and transmits the file according to the received request in connection the file whose storage location information is notified by the acknowledgment mail.

The file transmission section may read transmission destination information corresponding to the file requested to be transmitted from the storage section, and transmit the file to the user registered in the list stored in the user list storage section.

The document management server may further includes a reception completion mail creation section that creates a reception completion mail including information that specifies a transmission destination of the file when the file is transmitted by the file transmission section; and a reception completion mail transmission section that transmits the reception completion mail created by the reception completion mail creation section to a notification destination specified by user identification information corresponding to the transmitted file.

The file transmission section may further include a time measurement section that receives a request for transmitting one of multiple files described in the acknowledgement mail transmitted by the acknowledgment mail transmission section and measures time after the reception; and a time elapse determination section that determines whether a predetermined time elapses after receiving the request for transmission of the one file based on time measured by the time measurement section, wherein on reception of a request for transmitting a file different from the one file from a user having the same user identification information before the time elapse determination section determines that predetermined time elapses, the file transmission section transmits the one file and the different file and the reception completion mail transmission section transmits one reception completion mail where completion of transmission of the one file and the different file is described.

In order to attain the above object, a document managing method according to a second aspect of the present invention includes the electronic file storage step of storing an electronic file and an electronic folder; the reception step of receiving an electronic file, location information that designates an electronic folder for storing the electronic file, and destination information that designates a user of the other party to which registration of the electronic file is notified; the registration step of registering the electronic file received in the reception step in the electronic folder indicated by the location information received in the reception step; the user list storage step of storing a user list that associates a user accessible to the electronic file in the electronic folder with access permission that the user has for each electronic folder stored in the electronic file storage step; the first transmission step of transmitting a notification, indicating that the electronic file received in the reception step is registered in the registration section, to a user indicated by the user list set in the electronic folder that stores the electronic file registered in the registration step; and the second transmission step of transmitting a notification, indicating that the electronic file received in the reception step is registered in the registration step, and the electronic file registered in the registration step to a user, who is not included in the user list set in the electronic file that stores the electronic file registered in the registration step, among users of the other party indicated by the destination information received in the reception step.

In order to attain the above object, a program according to a third aspect of the present invention causes a computer to function as an electronic file storage section that stores an electronic file and an electronic folder; a reception section that receives an electronic file, location information that designates an electronic folder for storing the electronic file, and destination information that designates a user of the other party to which registration of the electronic file is notified; a registration section that registers the electronic file received by the reception section in the electronic folder indicated by the location information received by the reception section; a user list storage section that stores a user list that associates a user accessible to the electronic file in the electronic folder with access permission that the user has for each electronic folder stored by the electronic file storage section; a first transmission section that transmits a notification, indicating that the electronic file received by the reception section is registered by the registration section, to a user indicated by the user list set in the electronic folder that stores the electronic file registered by the registration section; and a second transmission section that transmits a notification, indicating that the electronic file received by the reception section is registered by the registration section, and the electronic file registered by the registration section to a user, who is not included in the user list set in the electronic file that stores the electronic file registered by the registration section, among users of the other party indicated by the destination information received by the reception section.

According to the present invention, it is possible to provide a document management server, document managing method, and program suitable for notifying registration of an electronic file irrespective of access permission.

BRIEF DESCRIPTION OF THE DRAWINGS

These objects and other objects and advantages of the present invention will become more apparent upon reading of the following detailed description and the accompanying drawings in which:

FIG. 9A is a flowchart explaining "mail distribution" setting processing;

FIG. 9B is a view illustrating a specific example of a mail distributed in the "mail distribution" setting processing;

FIG. 11A is a flowchart explaining "acknowledgment" execution processing;

FIG. 11B is a view illustrating a specific example of a mail distributed in the "acknowledgement" execution processing;

FIG. 15A is a view illustrating an example of a screen output to a display device connected to the MFP or computer;

FIG. 15B is a view illustrating an example of a screen output to the display device connected to the MFP or computer;

FIG. 15C is a view illustrating an example of a screen output to the display device connected to the MFP or computer;

FIG. 15D is a view illustrating an example of a screen output to the display device connected to the MFP or computer;

FIG. 15E is a view illustrating an example of a screen output to the display device connected to the MFP or computer;

FIG. 15F is a view illustrating an example of a screen output to the display device connected to the MFP or computer;

FIG. 15G is a view illustrating an example of a screen output to the display device connected to the MFP or computer;

FIG. 15H is a view illustrating an example of a screen output to the display device connected to the MFP or computer;

FIG. 15I is a view illustrating an example of a screen output to the display device connected to the MFP or computer;

FIG. 15J is a view illustrating an example of a screen output to the display device connected to the MFP or computer;

FIG. 31A is a view illustrating an example a response mail to be transmitted to the document management server from a registrant in the transmission destination list;

FIG. 31B is a view illustrating an example of a notification mail to be transmitted to a registrant in an address list from the document management server;

FIG. 34 is a view illustrating an example of an acknowledgement mail when a notification of registration of distribution files is sent at once;

FIG. 36 is a view illustrating an example of a reception completion mail.

DETAILED DESCRIPTION OF THE PREFERRED EMBODIMENT

Figure 1:
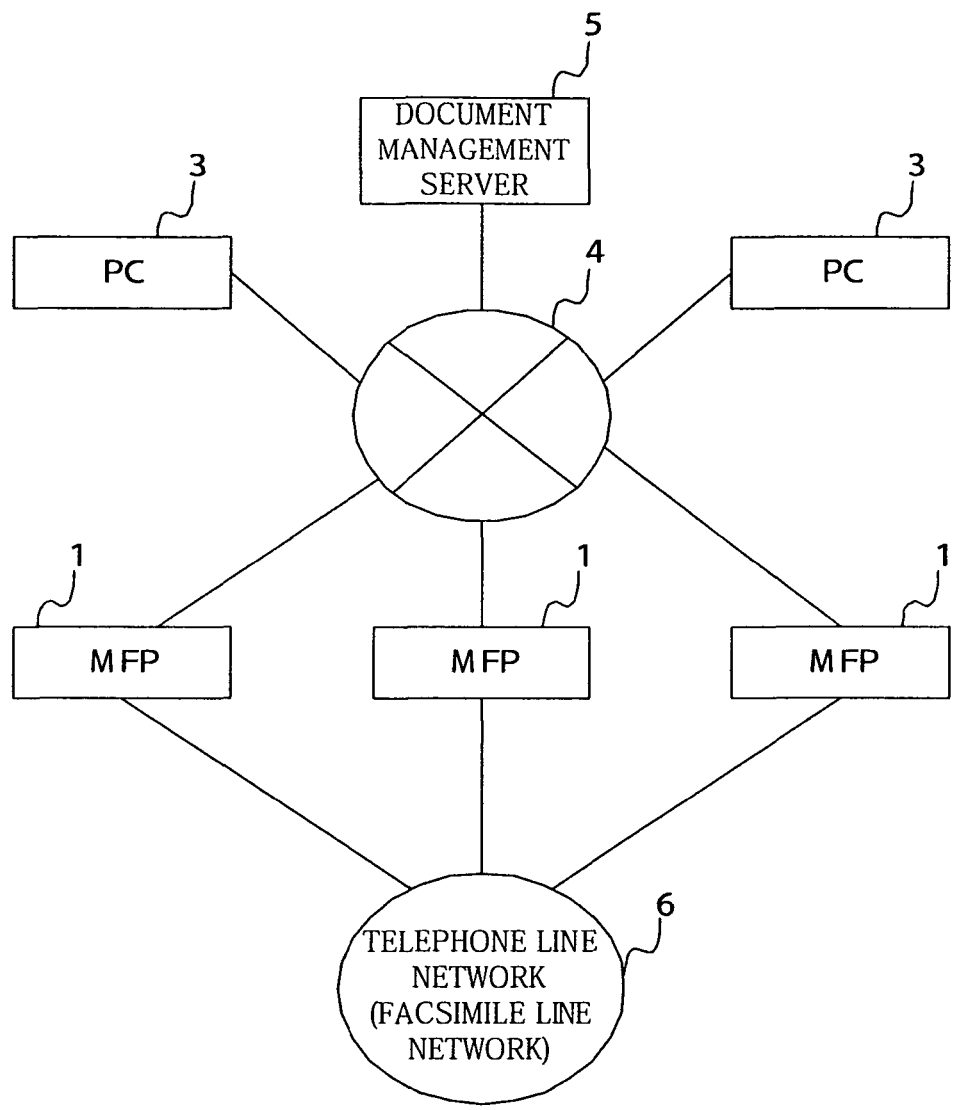
FIG. 1 is a view explaining an outline of a document management system.

The following will explain a document management system according to an embodiment of the present invention using FIG. 1. It is noted that an information terminal according to the present invention is configured in the form of a Multi-Function Peripheral <MFP> (for example, device having printing, copy, facsimile and other communication functions). Accordingly, in the following explanation, the information terminal according to the present invention is expressed as MFP 1.

A document management system shown in FIG. 1 is a system that provides various services to be described later to members, who are registered in the system in advance (hereinafter referred to as a membership organization), and employees, who belong to the membership organization (hereinafter referred to as members). The system includes MFPs 1, computers 3, a network 4, a document management server 5, and a telephone network 6. ① The membership organization can provide opportunities (e.g., reference, registration, cancellation, printing, etc.) for operating documents stored in the document management server 5 to the members via the network 4 by the method of this system to be described later. ② A manager of the membership organization can grasp a document utilization state of each member. ③ A service provider of the document management system can check the utilization state of the respective members and charge the membership organization for the service fee.

The MFP 1 shown in FIG. 1 is a Multi-Function Peripheral having multiple functions including a printer unit, a scan unit, etc. However, a scanner, a copy machine, a printer, a facsimile machine may be used single or in combination. Moreover, the MFP 1 includes a display section that can display various kinds of information for operating the respective functions (e.g., reference, printing, registration, cancellation, and the like) to be described later. In the present embodiment, a touch-panel display is used. Further, the MFP 1 includes a device that can attach an external storage media and has a media slot, which enables data delivery between the external storage media and the MFP 1. CD (Compact Disk) media such as USB memory, memory card, CD-ROM, and DVD (Digital Versatile Disk) such as DVD-ROM can be read through the present media slot.

Furthermore, an application for "referencing" or "printing" a file downloaded from the document management server 5 is installed into the MFP 1. Then, the application reads the downloaded file and generates data for displaying. Moreover, the MFP 1 is equipped with an image processor that converts display data into second display data, which is suited for the display section of the MFP 1, and displays the resultant data on the display section.

In addition, the MFP 1 may be set up at a place where one has gone such as satellite office, convenience store, post office, and the like, in addition to the main office. The point is that the MFP 1 may be connected to the document management server 5 via the network 4.

Figure 2:
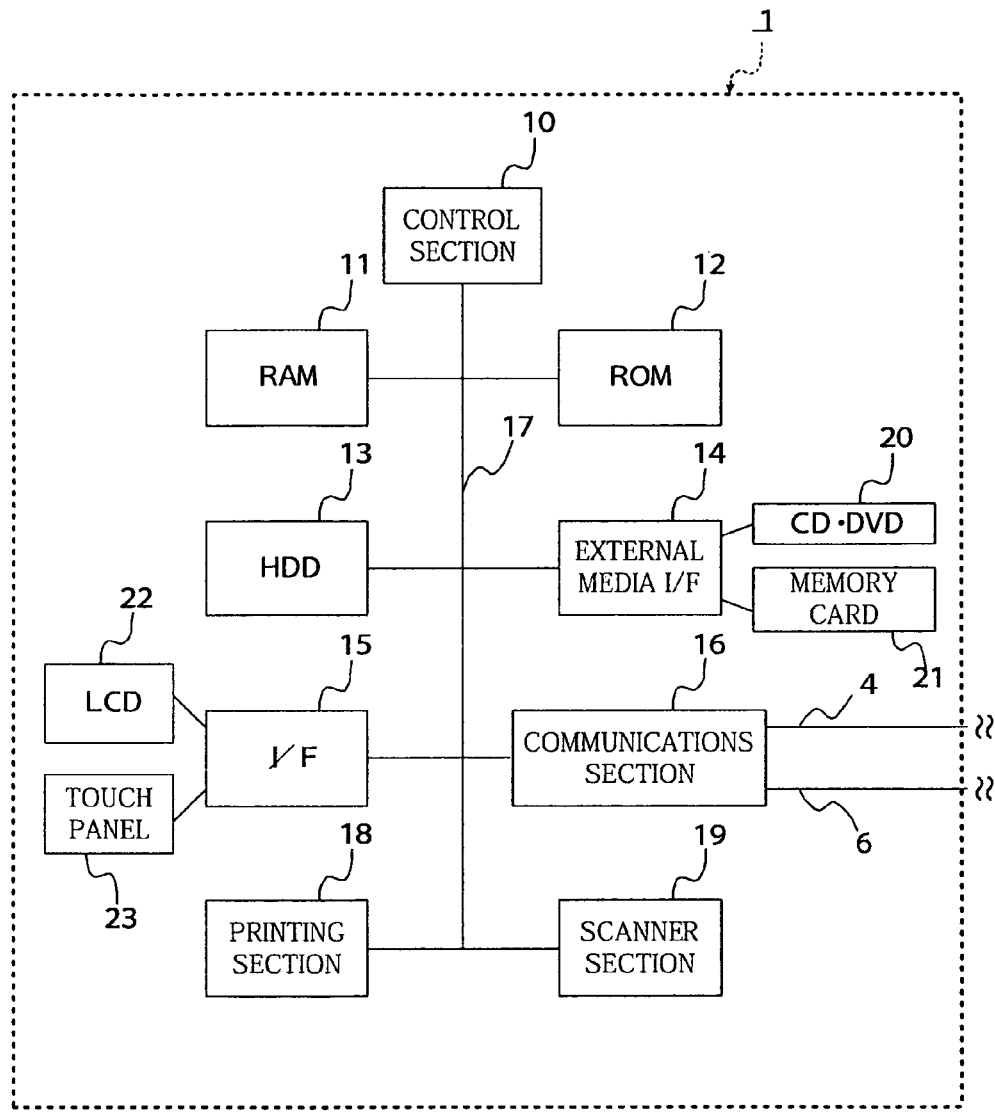
FIG. 2 is a view explaining a configuration of a multi-function peripheral (MFP)

The MFP 1 shown in FIG. 1 includes a control section 10, a RAM (Random Access Memory) 11, a ROM (Read Only Memory) 12, a HDD (Hard Disk Drive) 13, an external media I/F (InterFace) 14, an I/F 15, a communications section 16, a system bus 17, a printing section 18, a scanner section 19, a CD/DVD drive 20, a memory card 21, a LCD (Liquid Crystal Display 22, and a touch panel 23 as shown in FIG. 2.

The control section 10 is composed of a CPU (Central Processing Unit) and the like, and controls an operation of the MFP 1. For example, the control section 10 launches a predetermined application (for example, spreadsheet application, word processing application, etc.) installed in the HDD 13 in advance and executes an operation (referencing, printing, etc.) to the electronic file.

The RAM (Random Access Memory) 11 is a volatile memory that temporarily stores data (for example, data of a document file) necessary for processing to be executed by the control section 10.

The ROM (Read Only Memory) 12 is an involatile memory that stores a program for which the control section 10 controls the entirety of the MFP 1. For example, the ROM 12 stores a program for which the control section 10 controls an operation of transmitting and receiving a predetermined file from and to the document management server 5.

The HDD (Hard Disk Drive) 13 stores data necessary for the control section 10 to perform a predetermined operation. For example, the HDD 13 stores parameters for executing processing for a file format of, e.g., a text file, an image file, etc.

Moreover, the HDD 13 stores a predetermined software application for which the MFP 1 executes various kinds of operations (for example, referencing, and printing) to the electronic file. Then, the control section 10 reads the predetermined software application stored in the HDD 13 and develops the read application in the RAM 11, and executes various kinds of operations to the electronic file using the software application. Additionally, in the present embodiment, although the predetermined software application is stored in the HDD 13, this may be stored in the ROM 12.

The external media I/F 14 is a driver that is used for various kinds of storage media such as CD (Compact Disk) media, DVD (Digital Versatile Disk) media, USB (Universal Serial Bus) memory, memory card, and the like. The control section 10 writes the created file to the external media using the external media I/F 14.

The I/F 15 is an interface between an input device such as the touch panel 23 and the control section 10. A user touches a predetermined location of the touch panel 23 with his/her finger to make it possible to input necessary information to the MFP 1.

The I/F 15 is also an interface between an output device such as LCD (Liquid Crystal Display 22 and the control section 10. The user can recognize the operation state (for example, details on the print setting, details on display setting, error message, etc.) of MFP 1 by viewing an image and a message displayed on the LCD 22. Here, the LCD 22 is a dot-matrix type display device that enables to display arbitrary characters, marks, numerals, and graphics. It is noted that the LCD generally has a middle screen size.

Additionally, the I/F 15 may have an input device such as a keyboard, a mouse, etc.

The communications section 16 is an interface, which is composed of an NIC (Network Interface Card) and a modem, and connects the MFP 1 to the network 4 or telephone network (facsimile network) 6. Then, the communications section 16 performs communication with the network 4 based on TCP/IP protocol or facsimile communication with the telephone network 6. It is noted that the communications section 16 may be, for example, a modem device, an infrared communication device, etc., and the MFP 1 having no facsimile function may not be connected to the telephone network 6.

The system bus 17 is a transmission path through which commands and data are transferred among the control section 10, RAM 11, ROM 12, HDD 13, external media I/F 14, I/F 15, communications section 16, printing section 18, and scanner section 19.

The printing section 18 is a printer device that prints data of the file. The user performs an operation using the input device such as the touch panel 23 to make it possible to print data of a desired file. It is noted that the printing section 18 includes a device having a function of copying paper document, picture, and photograph.

The scanner section 19 is a scanner device that scans the paper document, picture, and photograph and converts them to digital data, and stores the result.

The CD/DVD drive 20 is a device that reads data recorded on the media such as CD and DVD. When the control section 10 detects that the CD or DVD is installed in the CD/DVD drive 20, the CD/DVD drive 20 starts to read the CD or DVD.

The memory card 21 is a portable storage medium that stores edited document data to mail the document data from the MFP 1 on the road. The user places the memory card 21 to the MFP 1 set up at the convenience store or the like and mails the edited document data through a predetermined procedure.

Figure 3:
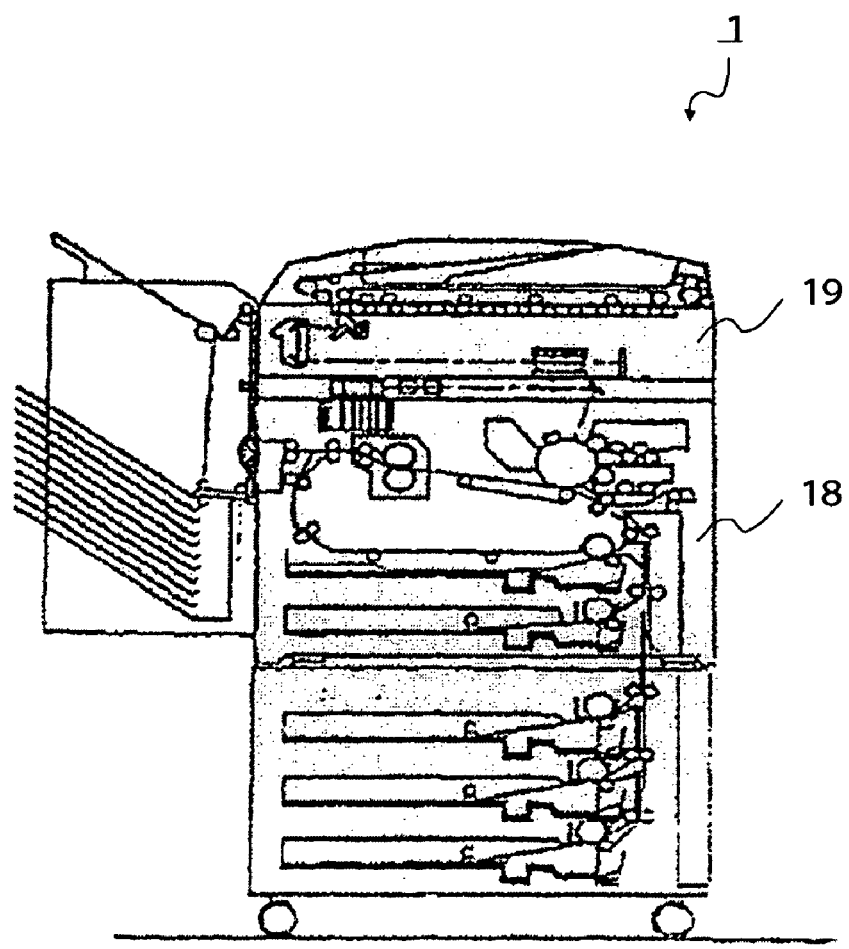
FIG. 3 is a view explaining an external appearance of the multi-function peripheral.

More specifically, as illustrated in FIG. 3, the MFP 1 according to this embodiment includes the printing section 18 with a paper feeding section, a print engine that can performs printing and copying, the scanner section 19 with a scanner function, and the communications section 16, which is not illustrated in the figure.

Each computer 3 illustrated in FIG. 1 is a PC (Personal Computer) for which the member registered in the document management system uses this system on the road. Software for using the document management system is preinstalled in the computer 3.

The network 4 interconnects the MFP 1, computer 3, and document management server 5 and mediates data communication there among. In the present embodiment, the network 4 is a network through which data is transmitted based on a communication program such as TCP/IP (Transmission Control Protocol/Internet Protocol). In addition, other protocols may be used. Moreover, either a local area network or a wide area network may be used as the network 4. A communication means such as a Virtual Private Network (VPN) and a wireless connection can be used in the same way.

Figure 5:
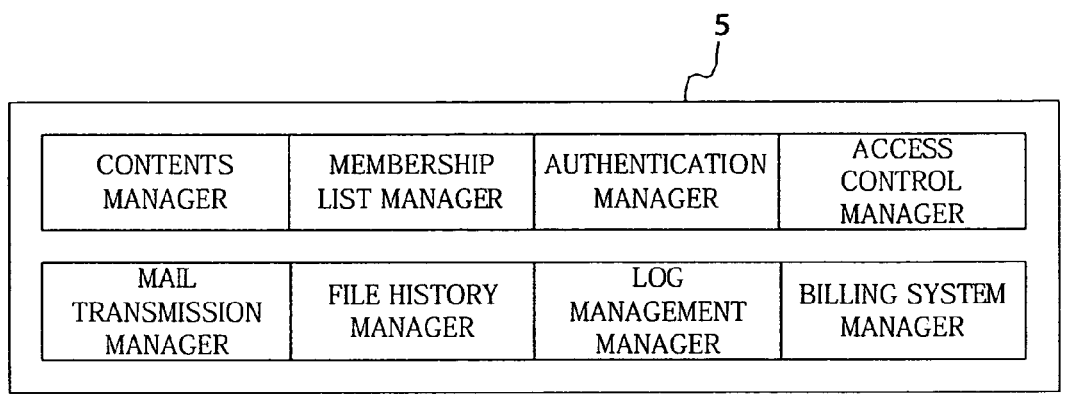
FIG. 5 is a view explaining functions that the document management server has.

The document management server 5 is connected to the MFP 1 and the computer 3 via the network 4, and performs various kinds of document management in response to the request of document operations from the MFP 1 and the computer 3. Moreover, as illustrated in FIG. 5, the document management server 5 includes functions for grasping users, who are called as a contents manager, a membership list manager, an authentication manager, an access control manager, a mail transmission manager, a file history manager, a log management manager, and a billing system manager, and for managing a file edit history, and a system using time. The respective manager functions will be described later.

Figure 4:
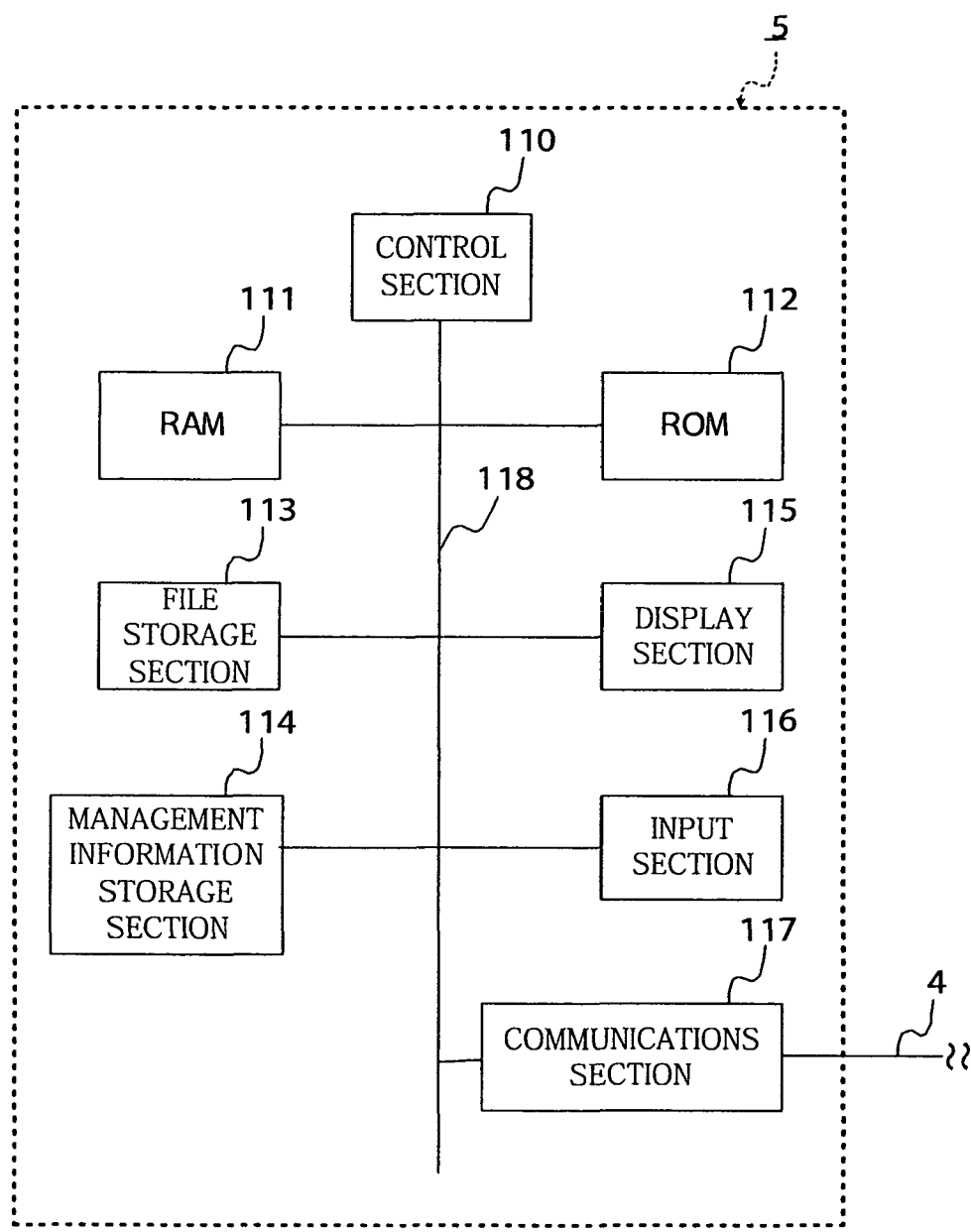
FIG. 4 is a view explaining a configuration of a document management server.

The physical configuration of the document management server 5 shown in FIG. 1 is composed of a control section 110, a RAM 111, a ROM 112, a file storage section 113, a management information storage section 114, a display section 115, an input section 116, a communications section 117, and a bus 118 as illustrated in FIG. 4.

The control section 110 includes a CPU (Central Processing Unit) and the like, and controls the entirety of the document management server 5. Particularly, in this embodiment, as illustrated in FIG. 5, the control section 110 operates as each of the functions including the contents manager, the membership list manager, the authentication manager, the access control manager, the mail transmission manager, the file history manager, the log management manager, and the billing system manager. The specific contents of each manager will be described later.

The RAM (Random Access Memory) 111 is a volatile memory that temporarily stores data (for example, data of a document file, and mail) necessary for processing to be executed by the control section 110.

The ROM (Read Only Memory) 112 is an involatile memory that stores a program for which the control section 110 controls the entirety of the document management server 5. In the present embodiment, the ROM 112 stores an operation program for which the control section 110 functions as each of the contents manager, the membership list manager, the authentication manager, the access control manager, the mail transmission manager, the file history manager, the log management manager, and the billing system manager.

The file storage section 113 includes a hard disk device and the like, and stores a document (e.g., document, table, figure that are created by the member of the membership organization) managed by the document management server 5.

The management information storage section 114 includes a hard disk device and the like, and stores information for managing the membership organization and the members who can use the document management server 5. For example, as illustrated in FIG. 8, the management information storage section 114 stores a user ID (member identification information of, e.g., employee number) of each member of the preregistered membership organization, and a password, a name, an affiliated organization, a nickname, a billing address, usage history information, etc. are registered on one or multiple records based on the ID as a key.

Here, the user ID is identification information that specifies a person who uses the document management system. The password is authentication information of the person (who uses the MFP 1 or computer 3). The name is the name of the person who has the user ID. The affiliated organization is information of the organization to which the member belongs, for example, a name of company where the member works and a name of department to which the member belongs. The billing address is information that specifies a party to be charged for member service fee, for example, an accounting department of the company where the member works. A nickname is information, which is inserted to the main body of an e-mail message to make it possible to distinguish a sender of e-mail. Namely, a mail address unique to each of the MFP 1 and the computer 3 is given thereto. Then, when the e-mail is transmitted from each of these devices, each e-mail address of these devices is set in a transmission field of e-mail. However, a recipient cannot specify a sender from a mail sent from the device that an unspecified person uses. Accordingly, in the present embodiment, the document management server 5 inserts the nickname in the main body of a mail to recognize the sender. It is noted that a mail address or the autonym may be used as the nickname. This mail address is an address to which a result (particularly, failure) of transmission of data or the file is notified. A contact address includes a telephone number, a facsimile number, and an individual mail address.

Moreover, the usage history information is the history indicating the number of times and how much hours the user having the ID used the document management system. Billing information is information of service fees of the document management system used by the member.

The display section 115 is an output device such as the LCD (Liquid Crystal Display).

The input section 116 is an input device that inputs a mail address such as a keyboard, a mouse, etc.

The communications section 117 is an interface, which includes an NIC (Network Interface Card) and connects the document management server 5 to the network 4. The communications section 116 may include, for example, a modem device, an infrared communication device, etc.

The system bus 118 is a transmission path through which commands and data are transferred among the control section 110, RAM 111, ROM 112, file storage section 113, the management information storage section 114, the display section 115, the input section 116, and the communications section 117.

An operation will be next given of each manager of the control section 110 shown in FIG. 5.

The contents manager restricts the kinds of files stored in the document management server 5 and the user's access to the folder that stores files.

Figure 6:
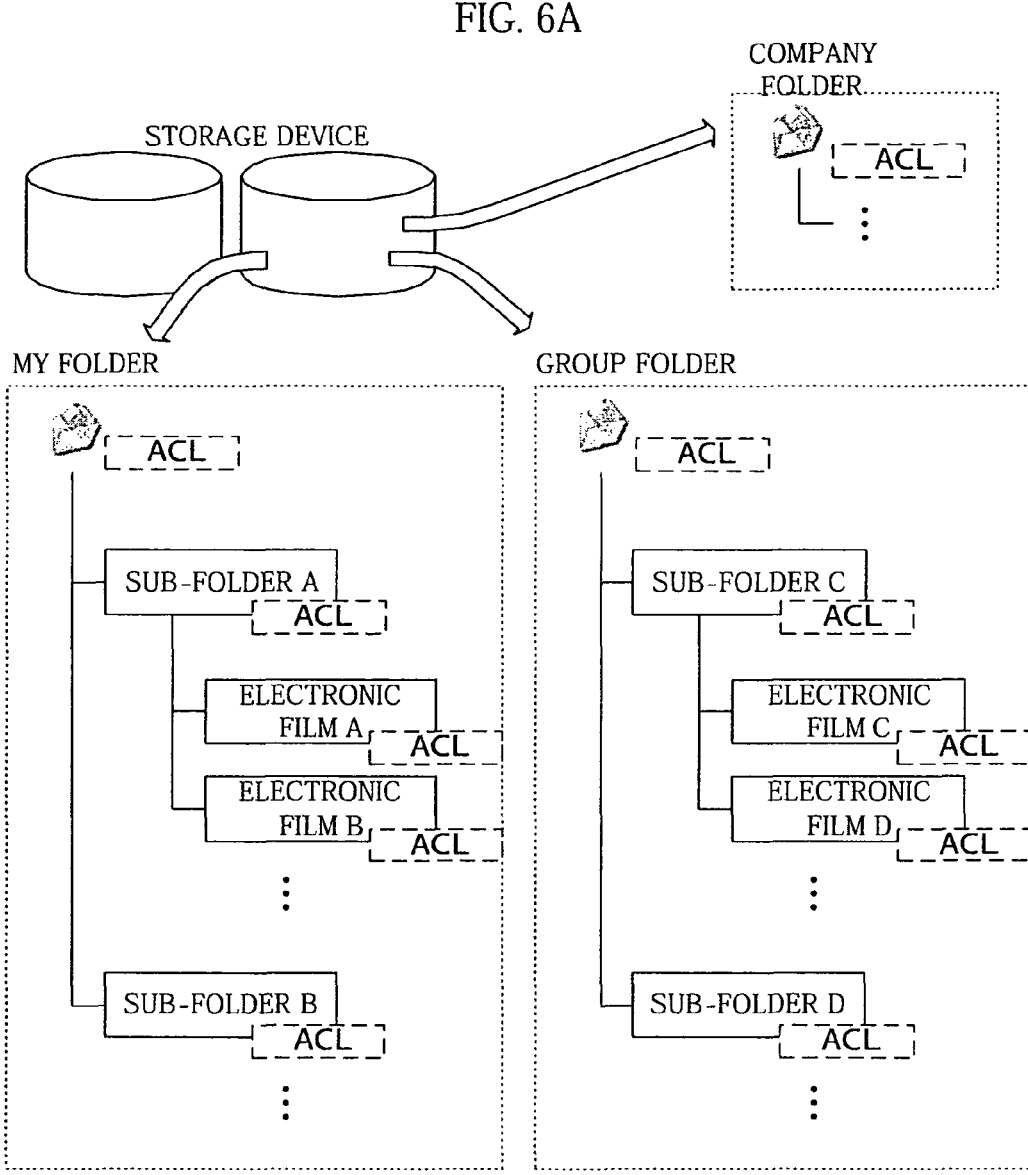
FIG. 6A is a view explaining functions of a contents manager.
FIG. 6B is a view illustrating an example of information that an access control list stores.

The contents manager can be connected to one or multiples storage devices (file storage section 113) as illustrated in FIG. 6A. Then, the contents manager can generate multiple folders in the storage device having one file, and can save the multiple files in the folders. Regarding the created folder, the number of folders corresponding to the number of operations may be prepared according to the file operation (the right to generate, update, and view). As mentioned above, the right to access to the folder or file is set, thereby making it possible to set various kinds of notification services such as "acknowledgment", "registration state information mail", and "self information mail" to be described later for each file.

The membership list manager stores the membership organization using the document management system and each member's affiliation to be associated with each other.

Figure 8A:
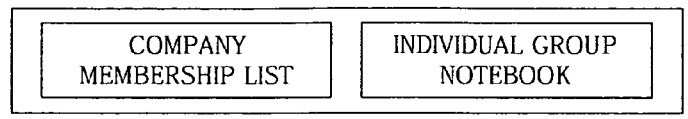
FIG. 8A is a view illustrating an example of information that the membership list manager stores.

The membership list manager saves information list (hereinafter referred to as membership organization list) such as addresses of all members who belong to the membership organization in the management information storage section 114 as illustrated in FIG. 8A. Also, the membership list manager classifies the members of the membership organization into certain groups (e.g., sales department, planning department, etc.) and saves them. Moreover, the membership list manager saves members registered in the membership group list and an individual and group notebook, which can set the relation with a member belonging to another group, in the management information storage section 114.

Figure 7:
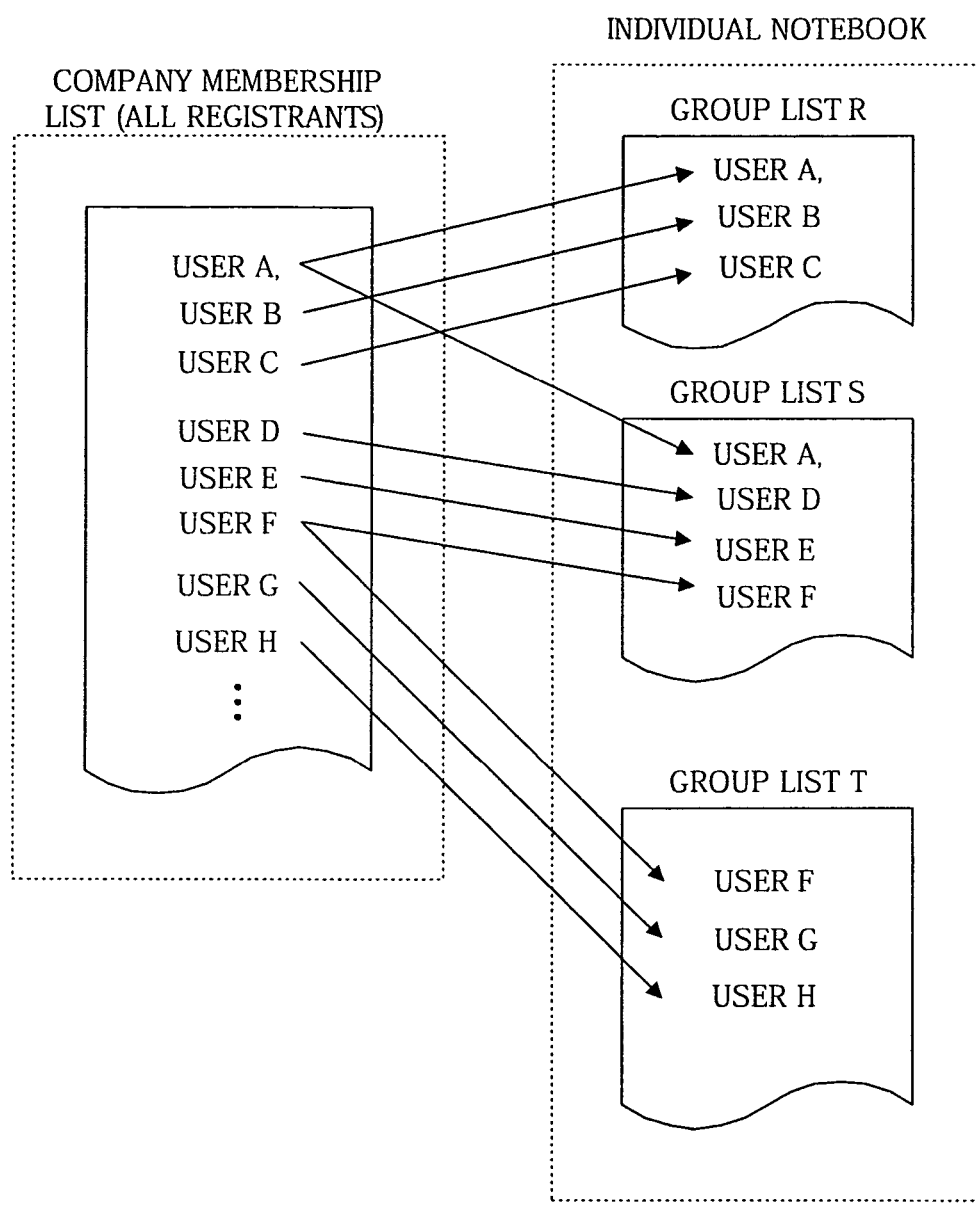
FIG. 7 is a view explaining functions of a membership list manager.
Figure 8B:
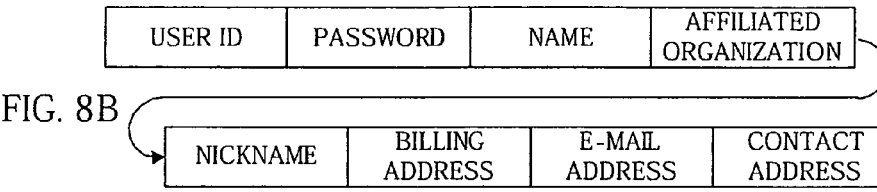
FIG. 8B is a view illustrating an example of information that the membership list manager stores.

More specifically, with respect to all members, user ID, password, name, affiliation organization (company, etc.), nickname, billing address, e-mail address, contact address (address, telephone number, facsimile number, network address (e.g., Notes mail address)) are saved in a company membership list as illustrated FIG. 8B. Moreover, multiple grouped lists (group lists) can be registered in the individual and group notebook as illustrated in FIG. 7. The member of the membership organization can copy member information registered in another group list of the company membership list, or change his/her nickname, or update his/her name, affiliation organization, contact address and save them.

The authentication manager performs processing for authenticating the user of the document management system.

The authentication manager determines whether login information (user ID and password) input from the MFP 1 or computer 3 is registered in the membership list manager in advance, thereby performing authentication of the member. Then, the authentication manager sends the authentication result to the MFP 1 or computer 3.

The access control manager determines whether the user, who was authenticated by the authentication manager, can gain access to a predetermined file, such as whether the user can refer to the file of the document management server 5, or whether the user can update the file.

More specifically, the access control manager restricts access to the file or folder (e.g., update and refers to the file) from the MFP 1 or computer 3 operated by the user. Moreover, when receiving a request for referring to the file or folder from the MFP 1 or computer 3, the access control manager determines whether the file or folder is accessible by the user, and transmits only the folder or file, which the user is allowed to access, to the information terminal.

For example, although a "company folder" and a "my folder" are described as folder names in FIG. 6A, the corresponding names are not always saved in the contents manager. Namely, "company code (e.g., COM0001)" and "user ID (e.g., USER0001)" may be saved in placed of the "company folder" and the "my folder", respectively. In this case, when the file name or the folder name is transmitted to the MFP 1 or computer 3 and the file name or folder name is displayed on the screen of the MFP 1 or computer 3, there may be provided a converting section that converts the name from "COM0001" to "company folder." This configuration makes it easy to view the file name or folder name displayed on the display of the computer 3 or the like.

When the file stored in the document management server 5 is updated or a new file is created, the mail transmission manager performs processing for notifying a predetermined user of the update of the file or the creation of the new file.

The mail transmission manager creates mail according to instructions from the MFP 1 or computer 3 operated by the member and instructions from the contents manager, and sends a notification to a predetermined member via a mail server.

The file history manager cyclically stores the file stored in the document management server 5.

The log management manager stores the function used by the user of the document management system and notifies it to the billing system manager to be described later.

Figure 8C:
FIG. 8C is a view illustrating information stored in a log management manager.

More specifically, the log management manager saves the history in which the MFP 1 and the computer 3 connected via the network 4 used the server to be described later as illustrated in FIG. 8C. For example, the log management manager records the respective items on a predetermined file in such a way that the time when the service is started and ended is set to "time and date", the user ID of the member, who has used the service, is set to "user ID" and the function of the used service such as "mail distribution function" is set to "use contents", and saves the file. Then, the log management manager transmits the history information to the billing system manager.

Upon reception of notification from the log management manager, the billing system manager performs billing processing based on the kind of function, time, etc of the document management system, which were used by the member of the membership organization.

Figure 8D:
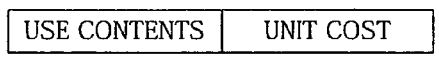
FIG. 8D is a view illustrating an example of information stored in a billing system manager.

For example, the billing system manager determines the function used by the user for each user, who has logged in the document management system from the MFP 1 or computer 3, and creates billing information by referring to a unit cost according to the contents as shown in FIG. 8D within a predetermined time limit of settlement.

Sequentially, a functional configuration of the document management server 5 will be explained. The document management server 5 includes a file management function, a security function, a mail transmission and reception function, and a history management function in terms of the function.

First, the file management function, which is performed by the contents manager, will be explained using FIG. 6A.

The contents manager of the document management server 5 saves the file created by the MFP 1 or computer 3 in the folder of the storage device (file storage section). Moreover, the member of the membership organization or the manager of the document management system can further generate a folder in the folder to make it possible to register the file in the folder classified by use. Additionally, in the present embodiment, to make it easy to understand the invention, the following will explain the configurations of these folders and files to be stored in the folders using the case in which "company folder", "group folder and "my folder" are created by way of example.

First, the company folder will be explained. The company folder is a folder, which all members registered in the company membership list shown in FIG. 7 can access, and each member can freely operates the files in the folder. Accordingly, the members registered in the company membership list share the files created in the company folder.

Moreover, the group folder is a folder, which only a specified member among the company members shown in FIG. 7 can access. The manager of the document management system can select a member, who will use the group folder, from these members, and cause the member to operate the file and folder. For example, the manager can generate a group folder for each department such as a folder for sales department, a folder for product planning, etc., under the company folder, and such group folders can be accessed by only the member, who belongs to the corresponding department. Then, the member of the business department can provide such setting that the member of the sales department cannot gain access to the folder for product planning. The manager first creates the group folder and sets a member who can use. After that, the set member can freely generate or delete a folder or file.

Further, my folder is a folder for which only an individual member of the company members uses. This folder is automatically created in the storage device of the document management server 5 when the user logs in using the computer 3 for the first time. In my folder, only the member himself/herself, who has created my folder, can operate the file or folder. It is noted that my folder may be pre-created in an initial state, but in the present embodiment, my folder is automatically created when the member logs in the document management server 5 for the first time in order to save creation time. Also, in the present embodiment, in order to prevent outsiders, e.g., employees of the company, except the members from logging in, at the time of logging in the document management server 5 for the first time, a login from only the computer 3 is allowed and a login from the MFP 1 is not allowed.

Moreover, the contents manager provides notification services such as "acknowledgment", "registration state information mail", and "self information mail" to each saved file.

The "acknowledgment" is a service that transmits the following mail. Namely, when the file saved by the contents manager is operated (for example, it is registered), mail, which indicates that the file is registered, is transmitted to the member, who is set in an ACL (Access Control List) of the file, and when the member, who has received the mail, gains access to the file, mail, which indicates that the contents of the file are confirmed, is transmitted to the mail sender. It is noted that ACL includes information indicating a file, a file ID of the folder, or a folder ID that sets access permission and the contents of the access permission (e.g., file creation and update are possible, only file reference is possible, user ID of member) as illustrated in FIG. 6B.

Moreover, the "registration state information mail" is a service that transmits the following mail. Namely, when it is detected that the file saved by the contents manager is operated (e.g., it is registered), mail, which indicates that the file is registered, is transmitted to the member, who is set in the ACL of the file.

Still moreover, the "self information mail" is a service that transmits the following mail. Namely, when the file, which is saved by the contents manager, is operated (e.g., it is updated) by the other member, who is set in the ACL of the file, mail, which indicates that the file is updated, is transmitted. More specifically, when the user ID of the member, who has set the "self information mail", is set in the ACL of the file saved by the contents manager and the member except the user ID operates (e.g., updates) the file, mail, which indicates that the file is updated, is transmitted to the member having the user ID who has set the "self information mail."

In addition, the contents manager may create a file for thumbnail display corresponding to the saved file, and save the file. At the time of using the "reference" function to be described later, the file for thumbnail display is transmitted to the MFP 1 or computer 3 from the document management server 5 to carry out thumbnail display, thereby preventing the member from erroneously downloading the file from the document management server 5 to the computer 3.

Regarding the aforementioned file operation, the right of access to the file and folder can be set by an access restricting section (security function) to be explained below.

An explanation will be next given of the security function in the present document management system. The security function includes security of the file itself or folder itself when the file or folder is created or referenced, and security of the member in accessing a certain file or folder. The following will explain these functions.

The access control manager of the document management server 5 restricts the user of the folder or file based on the ACL (Access Control List) shown in FIG. 6B. The access control manager restricts viewing, correction, registration, cancellation, printing (one or all of these is referred to as operation) of the folder or file. The member having the right of access to the file or folder is thus individually set, thereby making it possible to restrict the user, which can share or operate the folder or file, and prevent the member who has no access permission from erroneously tampering the document. More specifically, the access control manager restricts access to the file or folder by referring to the right of access to the folder or file, which is preset in ACL by the manager.

In the present embodiment, the right of access to the company folder or the file in the company folder is given to all the company members in the initial state of the document management system. Moreover, the right of access to my folder or the file stored in my folder is given to only the member who has created my folder or the file stored in my folder. Still moreover, the right of access to the group folder or the file stored in the group folder is given to only the member who belongs to the group.

When a new folder or file is created, the access control manager provides such setting that the ACL of the upper folder is automatically inherited. Also, the ACL of the file stored in the company folder can grant the access permission to multiple members at one time using the input section that the MFP 1 or computer 3 includes.

An explanation will be next given of the mail transmission and reception function in the present document management system.

The mail transmission manager of the document management server 5 transmits mail to the member of the membership organization registered in advance or an input address (not a member of the membership organization, hereinafter referred to as non-member) based on a mail transmission instruction from the contents manager. It is noted that transmission is performed via a mail server. The mail transmission manager includes a "mail distribution" function. The "mail distribution" function is a function that transmits the mail, which is created by each function of "acknowledgment", "registration state information mail", "self information mail", to a predetermined member. Sequentially, an explanation will be given of each function of the "mail distribution", "acknowledgment", "registration state information mail", "self information mail", which the document management server 5 includes, using FIGS. 9 to 13.

First, the "mail distribution" function will be explained using FIG. 9A.

The "mail distribution" function is a function that sends, from the document management server 5, information of file registration and reference and the like with an attachment of a file itself to a user address of a member belonging to the membership organization or other e-mail address (non-member) at a file registration (including update) time or reference time based on a request from the MFP 1 or computer 3.

Mail distribution processing shown in FIG. 9A is started upon detection of the operation of the touch panel 23 of the MFP 1 or computer 3 at the time of "registration" (including update) and "reference" to be described later. The MFP 1 or computer 3 determines whether an option of "mail distribution" is set to ON in connection with the file saved by the document management server 5 (step S1101). Then, when The MFP 1 or computer 3 determines that the option of "mail distribution" is set to ON (step S1101: Yes), the MFP 1 or computer 3 stores a mail address of a transmission destination designated by the MFP 1 or computer 3 (step S1102). This mail address may be input after obtaining an address list stored in the membership list manager of the document management server 5 and selecting the address therefrom, or this mail address may be manually input. On the other hand, when the MFP 1 or computer 3 does not determine that the option of "mail distribution" is set to ON (step S1101: No), the MFP 1 or computer 3 ends the mail distribution processing.

Next, the MFP 1 or computer 3 sends completion of the "mail distribution" option, that is, "registration" processing and "reference" processing, the transmission instruction of mail (hereinafter referred to as distribution mail) to be distributed by setting the option of "mail distribution" to ON, and the mail address stored in step S1102 to the document management server 5 (step S1103). When the above processing is ended, processing that is carried out by the MFP 1 or computer 3 is ended. Sequentially, when receiving the reception of notification of option setting of the "mail distribution" (step S1104), the mail distribution manager of the document management server 5 creates a file attachment mail and transmits the mail to the mail address notified in step S1103 (step S1105).

It is noted that a message that specifies an event that triggers the transmission of mail (message, e.g., an attached document is newly registered by A, the following document is updated by B, an attached file is referenced by C) is described in the body of the mail as illustrated in FIG. 9B.

Sequentially, the "acknowledgment" function will be explained. The "acknowledgment" function is composed of an "acknowledgment" setting function and an "acknowledgment" execution function. First, the "acknowledgment" setting function will be explained using FIG. 10A. Also, the "acknowledgment" execution function will be explained using FIG. 11A.

First, the "acknowledgment" setting function is a function that transmits mail, which includes link information to the file saved by the document management server 5, to a predetermined mail address based on the instruction from the MFP 1 or computer 3.

The MFP 1 or computer 3 determines whether the option of "acknowledgment" is set to ON at the time of the file "registration" (including update), "reference", etc., (step S1201). Then, when detecting that the option of "acknowledgment" is set to ON (step S1201: Yes), the MFP 1 or computer 3 notifies the document management server 5 that the option of "acknowledgment" is set to ON (step S1202). On the other hand, when it is not detected that the option of "acknowledgment" is set to ON (step S1201: No), the MFP 1 or computer 3 ends the acknowledgment setting processing. When step S1202 is ended, processing to be carried out by the MFP 1 or computer 3 is ended. Then, processing goes to processing in the document management server 5.

When receiving a notification that the setting of "acknowledgment" of the file is set to ON (step S1203), the mail transmission manager of the document management server 5 accesses the membership list manager and obtains a name of a setter, who has set the "acknowledgment", from the user ID used when logging in the MFP 1 or computer 3 (step S1204). Then, the mail transmission manager obtains an address of the member (member who is allowed to access this document) set in the ACL (Access Control List) of the relevant file (step S1205).

Figures 10A, 10B:
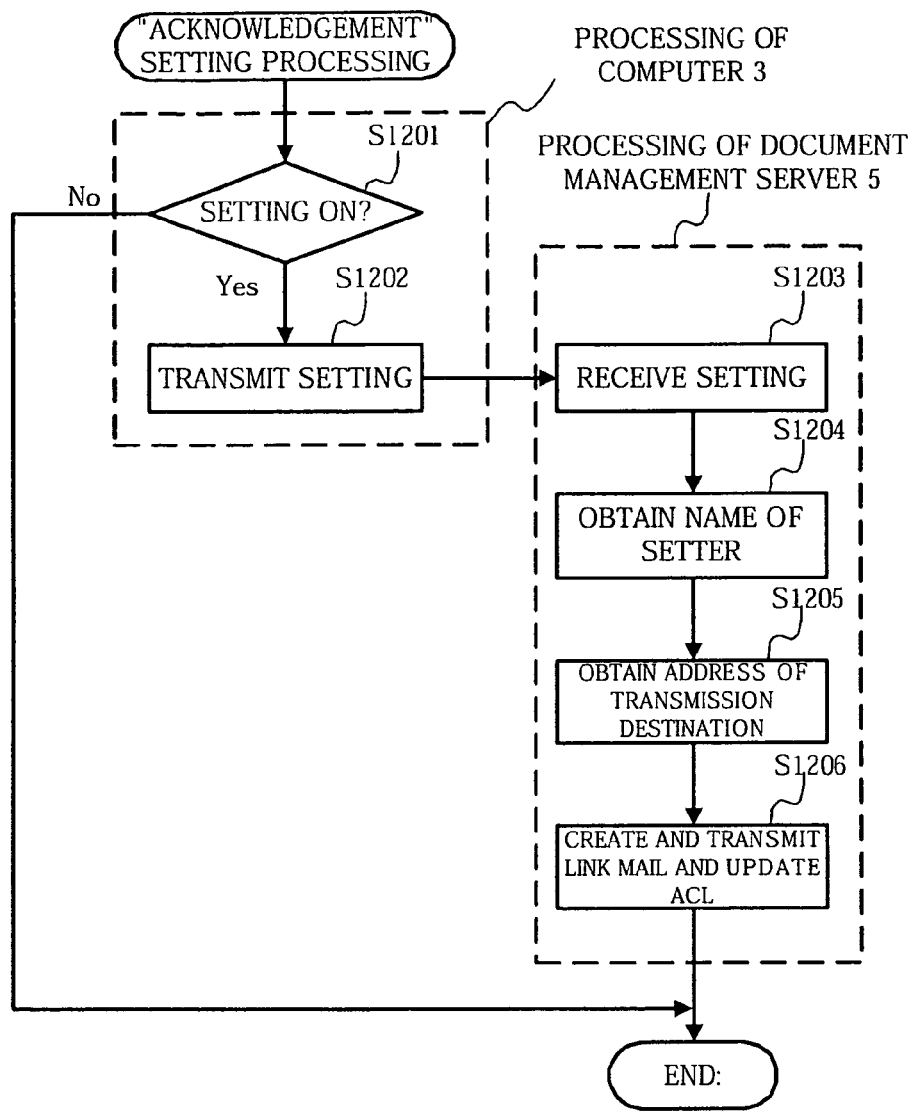
FIG. 10A is a flowchart explaining "acknowledgment" setting processing.
FIG. 10B is a view illustrating a specific example of a mail distributed in the "acknowledgement" setting processing.

Next, the mail transmission manager creates mail in which the name of the setter, who has set the "acknowledgment", and link destination information to the file are described as illustrated in FIG. 10B. Then, the mail transmission manager transmits the mail to the address of the member set in the ACL of the file. Moreover, the contents manager of the document management server 5 writes the user ID of the member, who has set the "acknowledgment", in the ALC of the file in which the "acknowledgment" is set (step S1206).

Sequentially, the "acknowledgment" execution function will be explained using FIG. 11A. The "acknowledgment" execution function is a function that transmits an acknowledgment mail to the setter, who has set the "acknowledgment", when a recipient, who has received a mail with link sent by the "acknowledgment" execution function, gains access to a link destination described in the mail.

When the member, who has received the acknowledgment mail, clicks link destination information of the mail sent by the "acknowledgment" setting processing, the computer 3 detects the click operation (step S1301). Then, the computer 3 notifies the document management server 5 of the access to the transmitted file (step S1302). When receiving the notification, the contents manager of the document management server 5 notifies the mail distribution manager of the reception of the notification (step S1303). Then, the mail distribution manager stores the user ID of the member having the address obtained in step S1205. Then, the mail distribution manager gains access to the membership list manager to obtain the name of the member who has accessed the relevant file (step S1304). After that, the mail distribution manager inserts the name of the member, who has accessed the file, in the mail to be transmitted, and creates a mail illustrated in FIG. 11B, and sends the mail to the address of the member, who has set the "acknowledgment" (step S1305).

Figures 12A, 12B:
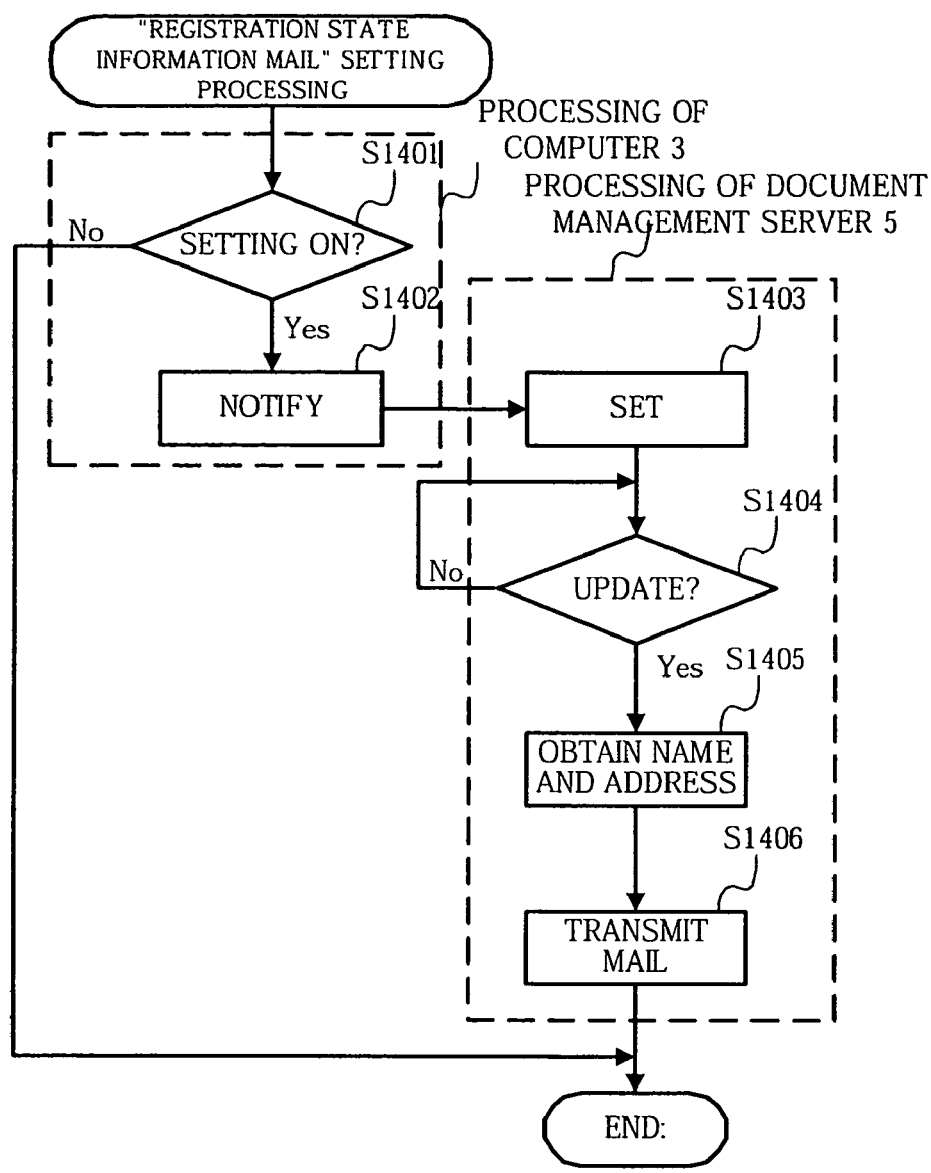
FIG. 12A is a flowchart explaining "registration state information mail" setting processing.
FIG. 12B is a view illustrating a specific example of a mail distributed in the "registration state information mail" setting processing.

Sequentially, an explanation will be given of "registration state information mail" setting processing using FIG. 12A.

The "registration state information mail" is a function that sends notification in which the file is operated (e.g., registered and referenced) to the address of each member set in the ACL of the relevant file when the file is operated (e.g., registered and referenced).

The MFP 1 or computer 3 determines whether the option of "registration state information mail" is set to ON at the time of "registration" and "reference" (step S1401). Then, when detecting that the option of "registration state information mail" is set to ON (step S1401: Yes), the computer 3 notifies the document management server 5 that the "registration state information mail" of the relevant file is set to ON (step S1402). On the other hand, when it is not detected that the option of "registration state information mail" is set to ON (step S1401: No), this processing is ended.

Then, when receiving the file in which "registration state information mail" is set to ON from the computer 3 in step S1402, the contents manager of the document management server 5 saves setting information of the option (step S1403). After saving the option setting, the contents manager determines whether there is an update of the file (including an overwriting of the file, a deletion thereof, etc.) from the member (step S1404).

Additionally, in step S1401, when processing such as "registration", "reference" etc., is performed from the computer 3, it is detected that the option of "registration state information mail" is set to ON. However, in step S1404, when it is detected that the file is updated, it may be determined whether the "registration state information mail" is set to the file.

Then, when it is determined that the file to which the "registration state information mail" is set is updated (step S1404: Yes), the user ID of the member, who has updated the file, is notified to the mail distribution manager in order to send the "registration state information mail."

Next, the mail distribution manager accesses the membership list manager and obtains (1) a name and an address corresponding to the user ID of the member, who has updated the file, and (2) an address of the member set in ACL of the file, from the membership list manager (step S1405). Then, the mail distribution manager inserts the name of the member obtained from the membership list manager and a link destination of the file to create mail as illustrated in FIG. 12B, and transmits the mail to the address of the member set in ACL of the file (step S1406). In this example, although the mail is transmitted to all members set in the ACL, the mail may be distributed to the member, who has set the "registration state information mail" to ON, among the members set in the ACL. It is noted that an important update such as deletion is desirably notified to all members without condition.

Figure 13A:
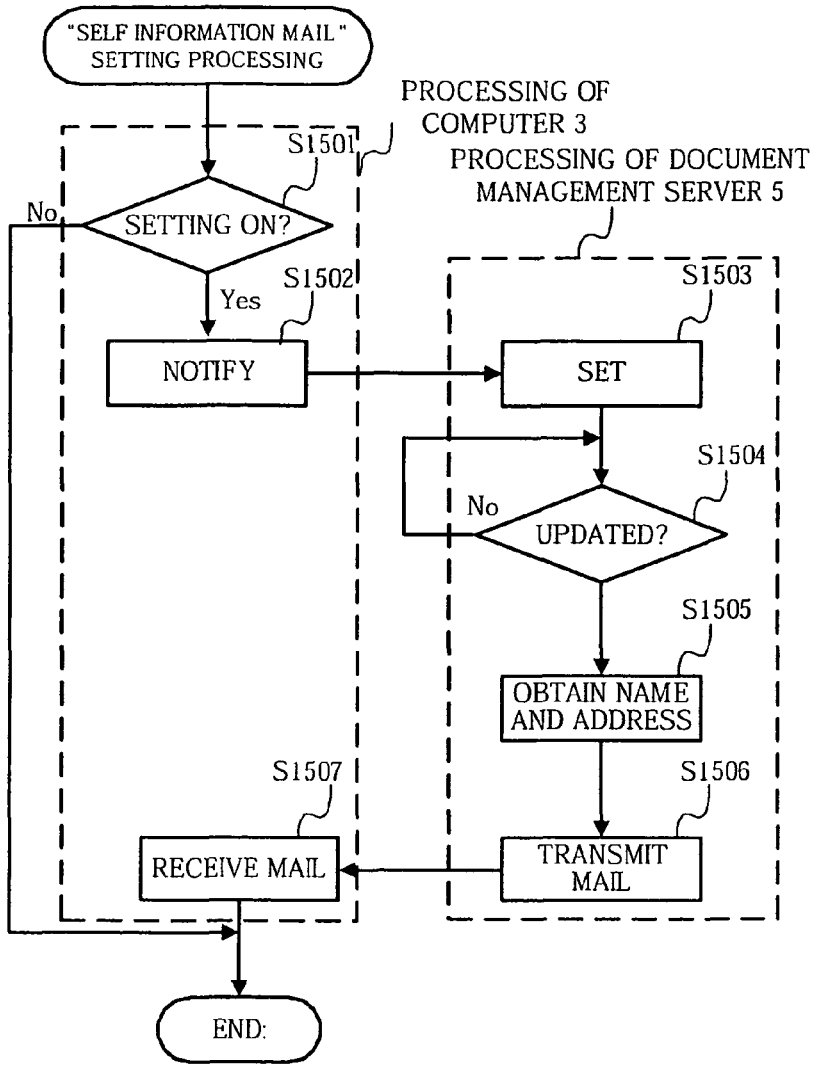
FIG. 13A is a flowchart explaining "self information mail" setting processing.

Sequentially, "self information mail" setting processing will be explained using FIG. 13A.

The "self information mail" is a function that sends notification in which the file is operated (e.g., updated) to the address of the member preset in the file when the file is updated. The member can set the option of "self information mail" to ON in connection with a certain file by executing the "self information mail" setting processing from the MFP 1 or computer 3. The computer 3 determines whether this setting is performed. Then, the computer 3 determines whether the "self information mail" setting is ON (step S1501). Then, when determining that the "self information mail" setting is ON (step S1501: Yes), the computer 3 notifies the document management server 5 that the "self information mail" of that file is set to ON (step S1502). On the other hand, when it is not determined that the "self information mail" setting is ON, the "self information mail" setting processing is ended.

Then, when receiving the notification in which the "self information mail" is set from the computer 3, the contents manager of the document management server 5 saves the user ID of the member, who has set the "self information mail" (step S1503). Then, the contents manager determines whether the file is updated (including overwriting and deletion of the file) (step S1504). In this example, when a predetermined operation is performed from the computer 3, the setting of the "self information mail" is notified to the document management server 5. However, the following processing may be carried out. Namely, when a certain member updates a file, it is determined whether the "self information mail" is set, and when the "self information mail" is set, processing goes to step S1505.

In connection with the file in which the "self information mail" is set, when the update is detected (step S1504: Yes), the user ID of the member, who has updated the file, is notified to the mail distribution manager. Then, the mail distribution manager accesses the membership list manager and obtains a name and an address corresponding to the user ID of the member, who has updated the file. Then, the mail distribution manager obtains the address of the member who has determined that the "self information mail" is set in step S1501 (step S1505).

Figure 13B:
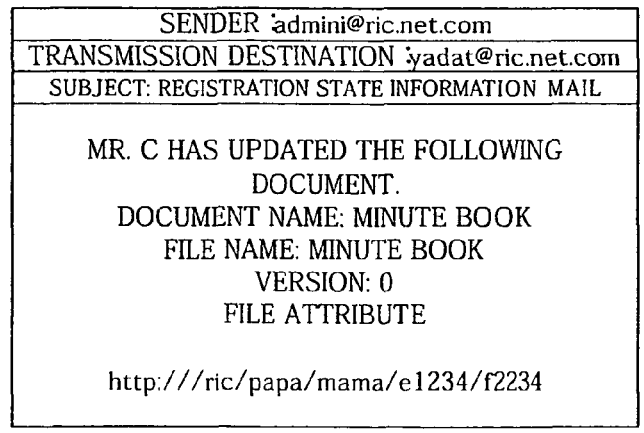
FIG. 13B is a view illustrating a specific example of a mail distributed in the "self information mail" setting processing.

Then, the mail distribution manager inserts the name of the member and the link destination of the file set in step S1505 into a mail to create the mail as shown in FIG. 13B. After that, the mail distribution manager transmits the mail to the address of the member who has set the "self information mail" (step S1506). The member who has set the "self information mail" recognizes that the file has been updated by receiving the mail (step S1507).

In the present embodiment, when the option of "mail distribution" is set to the document management server 5, the mail distribution manager sends the notification with the attachment of a file itself regardless of whether the user is the member or non-member. However, other configuration may be possible. Namely, when receiving address information of the transmission destination from the computer 3, the document management server 5 determines whether the address indicates the member of the company membership or the non-member, and when it is determined that the address indicates the member of the membership organization, the document management server 5 may send mail with a link, and when it is determined that the address indicates the non-member, the document management server 5 may send a notification with an attachment of a file itself.

Moreover, in the present embodiment, when the option of "mail distribution" is set, the mail distribution manger accesses the membership list manager to obtain the address list and select the address. However, when the transmission destination of mail is the member of the membership organization, only the user ID and name of the member of at least the membership organization may be obtained and this configuration can bring efficiency to member distribution processing.

Moreover, in the present embodiment, when the option of "acknowledgment" is set, the mail distribution manager accesses the membership list manager and refers to a preset ACL, and transmits mail with "acknowledgment" to the member registered in the ACL. The above configuration makes it possible to request the member of the company membership registered in the ACL to confirm the file by the simple operation, and this makes it possible to recognize whether the file is accessed.

Moreover, in the present embodiment, the "mail distribution" transmission destination and the "acknowledgment" transmission destination are registered to be different from each other in the document management server 5. Namely, in the case of the "mail distribution", the mail can be transmitted to all users having mail addresses regardless of whether they are member or not. However, in the case of the "acknowledgment", the mail can be transmitted to only the member of the company membership. This configuration eliminates the need for ensuring the security such as restriction on the access to the file at the link destination at the time of transmitting the mail with link to the nonmember.

Furthermore, both the "registration state information mail" and the "self information mail" can be set to the file. However, in the case where both are set thereto, transmission of both mails will lead to transmission of numerous mails having the same effect of a message and apply a load on the network. For this reason, in the case where both the "registration state information mail" and the "self information mail" are set, only either of two may be configured to be transmitted. Moreover, if the contents of the "registration state information mail" are the same as those of the "self information mail", user's confusion can be prevented even if only one mail is transmitted.

Figure 14:
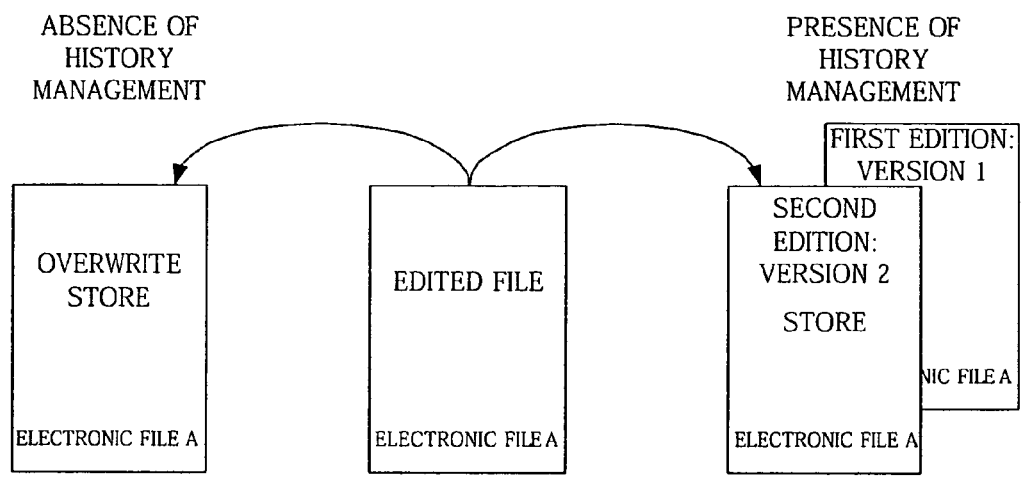
FIG. 14 is a view explaining a function of a file history management.

An explanation will be next given of a file history management in the present document management system with reference to FIG. 14.

It is assumed that a mode of "history management" is set and a certain file (file A) is operated from the MFP 1 or computer 3. When the file history manager of the document management server 5 saves the file A, for example, two times though a file name, which is displayed on the display of the MFP 1 or computer 3, is the same, two kinds of files including the file (file A) saved first time and a file (file A') saved second time can be saved.

Moreover, when the file A' is updated and saved, the file (file A') saved second time is overwritten on the file (file A) saved first time. A file (file A"), which is obtained by updating the file A' and saving the updated file, is overwritten on the file (file A') saved second time. Thus, in connection with one file, files for two histories (two cycles) are automatically saved. Additionally, in the explanation given below, a first file is assumed to version 0, and each version of the file can be referred, extracted, and printed. On the other hand, when a mode of "no history management" is set, the history management is not carried out and only the latest file is saved in the document management server 5. In addition, whether or not the history of the file is managed can be set when the file is registered in the document management server 5 or updated. In the present embodiment, the history of the file is not managed in the initial state. Moreover, as described later, each history file can be operated from the computer 3, but each history file is prohibited from being operated from the MFP 1. The reason is as follows. Namely, for example, in a case where the MFP 1 is set up at the convenience store, there is a possibility that a user, except the members of the membership organization who use the document management system, will misuse the document management system using the MFP 1.

The following will explain a relationship between the file history management and an operation in mailing the file.

The file history manager saves a file cyclically and performs "mail distribution" processing, so that a file can be transmitted to a predetermined member. However, since the operation of the document management server 5 differs between a case in which the MFP 1 is operated to instruct a file transmission and a case in which the computer 3 is operated to instruct a file transmission, the following will explain the contents of transmission.

<Case of Operation from MFP 1>

Case where mail distribution is performed at a file referring (displaying) time (case where the contents of the file is displayed to transmit the file):

A file of the latest version (namely, 0) is always attached to mail to be distributed. For example, if the relevant file is overwritten when the history management is OFF, the file is transmitted, and even if there is a file of a version other than the latest version when the history management is ON, the file of the latest version 0 is always sent.

Case where mail distribution is performed at a file registration time (case where a file is newly registered and the registered file is transmitted):

The same as the case at the file referring time.

<Case of Operation from Computer 3>

Case where mail is distributed without designating the version at a file referring time:

A file of the latest version (namely, 0) is always attached to mail to be distributed. For example, if the relevant file is overwritten when the history management is OFF, the file is transmitted. Also, even when a file of a version other than the latest version is created when the historical management is ON, the file of the latest version 0 is always sent.

Case where mail is distributed after designating the version at a file referring time:

Mail to which a file of a designated version (e.g., 0 (latest), 1 (one previous version), 2 (two previous version), 3 (three previous version) and the like) is attached is transmitted.

Case where mail distribution is performed at a file registration time:

A file of the latest version (namely, 0), that is, a file registered this time is always attached to mail to be distributed. Even if the relevant file is overwritten when the history management is OFF or a file of other version is created when the history management is ON, the file of the latest version registered this time is sent.

This configuration enables the member of the membership organization to designate a specific version of the file, which is historically managed by the file history manager, and transmit the file of the version to a predetermined member. Moreover, the file of the latest version can be always transmitted. Still moreover, the history management is not carried out from a specific information terminal apparatus (for example, MFP 1), thereby preventing the file from being occupied by the MFP 1 for a long time.

In the present embodiment, the notification is made using the latest version. In this case, when some of files are deleted, the latest version of the residual files is opened. Additionally, when the files of all versions are deleted, an error message indicating that "there is no file" is displayed. Moreover, the file of the specified version except the latest one is transmitted. In this case, when the specific version is deleted, an error message indicating that "there is no file" is displayed. However, when deletion of the file is detected, mail indicating that the file is deleted may be transmitted to the transmission destination of the relevant mail. This prevents unnecessary access to the document management server 5 from the information terminal.

Moreover, the notification is made using the specified version. In this case, when the file of the relevant version is deleted, the file of the latest version may be displayed.

An explanation will be next given of the procedure of using each function of the document management server 5 from the MFP 1. First of all, explanation will be given of processing from an initial state to selection of each function.

(Opening)

On power-on, the MFP 1 displays an opening screen on the display section and waits for an operation from a user. Also, the present opening screen is displayed when no operation is input for several minutes in a state that a screen is moved to the other screen or when end of each function is input. In the present embodiment, as illustrated in FIG. 15A, "Touch Here" (start button) for instructing the start of the service is placed at a central portion of the screen and the MFP 1 waits for the user input. When the start button is pressed, a function selection screen is displayed.

(Function Selection)

After detecting the depress of the start button, the function selection screen is displayed as illustrated in FIG. 15B, and the MFP 1 waits for the user input. In the present embodiment, when a button corresponding to each function is selected on the function selection screen, function buttons for selecting the respective functions of "register", "print", "delete", "reference", and "extract" are arranged as illustrated in FIG. 15C. When each of the function buttons is depressed, function selection information is notified to the document management server 5 via the network 4. After that, a login screen is displayed.

(Login)

After detecting the depression of each function button, a login and password input screen is displayed as illustrated in FIG. 15D, and the MFP 1 waits for user input of login information. When login information, namely, "user ID" and "password" are input from the user, the login information is transmitted to the document management server 5 and the MFP 1 waits for an authentication result. When receiving a notification that authentication is OK, the MFP 1 displays an operation screen according to each function to be described later. Additionally, when receiving a notification that authentication is NQ the MFP 1 displays a screen that urges the user to input login information without displaying the screen for operating the function.

An explanation will be next given of each function illustrated in FIG. 15C. The function of "register from MFP" will be first explained using FIG. 16.

The function of "register from MFP" is a function that scans a document such as paper by a scanner included in the MFP 1 and saves scanned image data in the document management server 5 or on the storage media attached to the device connected to the external media I/F 14 of the MFP 1. Also, this is a function that saves the file saved on the storage media attached to the device connected to the external media I/F 14 of the MFP 1 to the document management server 5. The detailed description will be given as follows.

Figure 16:
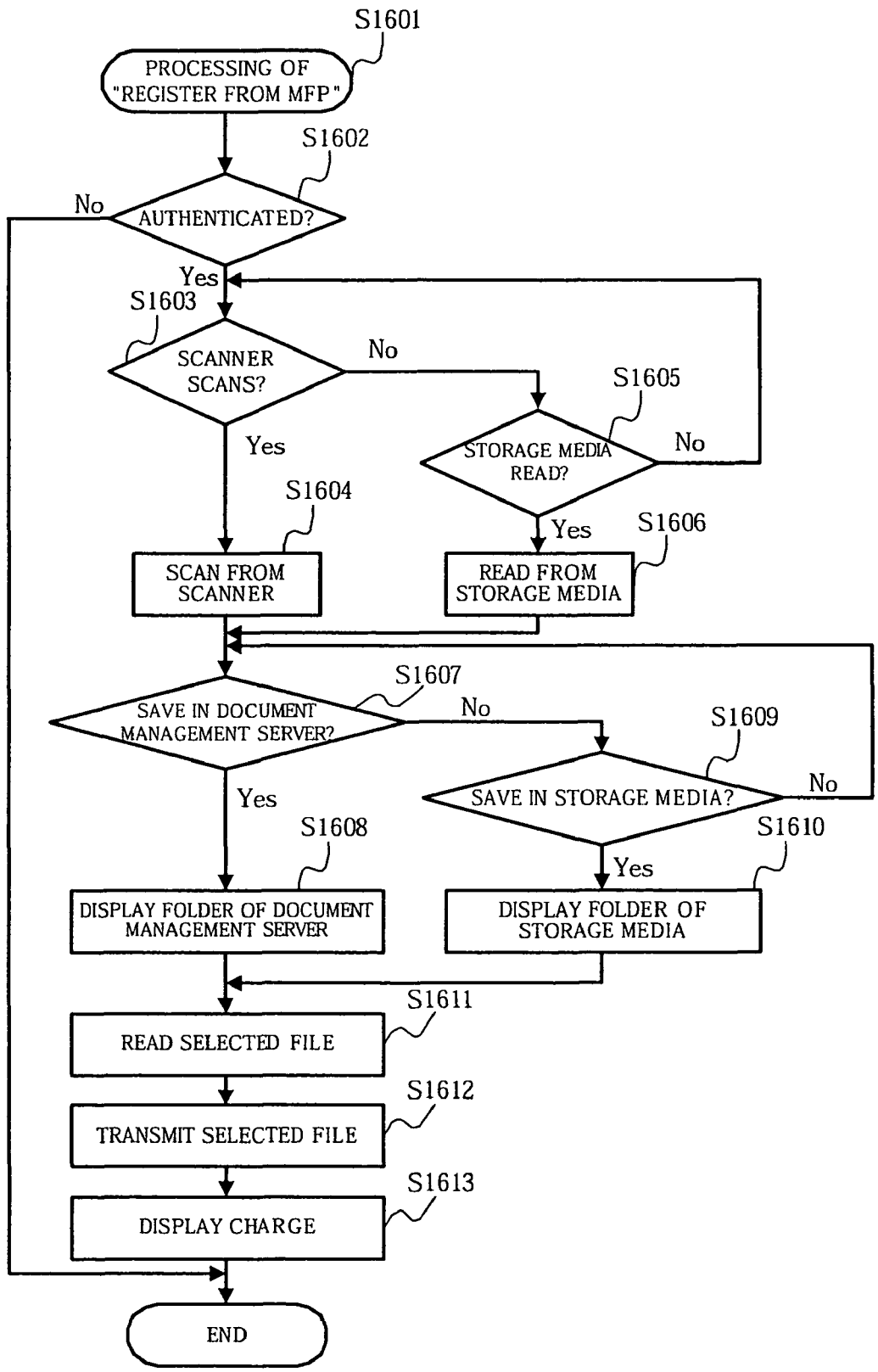
FIG. 16 is a flowchart explaining the processing of "register from MFP"

When "register" is selected on the aforementioned function selection screen (FIG. 15C), the control section 10 starts processing of a flowchart in FIG. 16 (step S1601) to first perform authentication processing using the screen of FIG. 15D to determine whether authentication is OK (step S1602). Then, when authentication is OK (step 1602: Yes), the MFP 1 displays a screen as illustrated in FIG. 15E to select (A) an image file, which is obtained by scanning a document such as paper set in the scanner, or (B) an electronic file, which is saved on storage media 20 and 21 attached to the external media I/F 14 of the MFP 1, on a display section composed of the LCD 22, and waits for user input (step S1603).

When the control section 10 detects that "(A) document such as paper set in the scanner" is selected (step S1603: Yes), the MFP 1 drives the scanner section 19 to read data and create file including the relevant data (step S1604). On the other hand, when "(B) storage media" is selected (step S1603: No and step S1605: Yes), the MFP 1 read the file from the storage media 20 and 21 (step S1606). In addition, when neither "(A) document such as paper set in the scanner" nor "(B) storage media" is selected (step S1605: No), the MFP 1 displays the screen in FIG. 15E and is standby.

Next, the MFP 1 (control section 10) displays a screen of FIG. 15F and causes the user to select whether the file should be saved to (a) the document management server 5 or (b) on the storage media 20 and 21 attached to the MFP 1 (step S1607).

When "saving to the document management server" is selected (step S1607: Yes), the MFP 1 gains access to a saving location of the selected file and displays folder information of a storage destination (step S1608). On the other hand, when "storage media" is selected (step S1607: No and step S1609: Yes), the MFP 1 gains access to the storage media and displays a folder of the storage destination (step S1610). In addition, when neither "saving to the document management server" nor "storage media" is selected (step S1609: No), the MFP 1 displays the screen in FIG. 15F and is standby.

After that, when the user selects a certain folder from among the folders displayed in step S1608 or step S1610, the MFP 1 reads (A) the image file obtained by scanning the document such as paper set in the scanner or (B) the file saved on the storage media attached to the MFP 1 (step S1611). Then, the MFP 1 transmits the read file to the document management server 5 (step S1612). After transmitting the file, the MFP 1 receives billing information from the document management server 5 and displays a charge on the display screen (step S1613).

Additionally, at the time of using the function of "register from MFP", when (A) image data obtained from the document such as paper set in the scanner is selected, a setting screen for scanner conditions may be displayed to set scanner conditions. The following scanner conditions may be settable. Namely, the scanner condition includes a kind of document (kind of document to be scanned), identification between top and bottom (top and bottom of the document is automatically identified), the number of documents (the number of documents to be scanned), storage format (format of file to be stored after scanning), scanning resolution (resolution at a scanning time), document surface (document is one-sided or two-sided), image quality (image quality and compression rate when color scanning and storage are performed), and the like.

Moreover, in the present embodiment, at the time of using the function of "register from MFP", when (a) "saving to the document management server" is selected, various kinds of setting screens that can set the file saved as illustrated in FIGS. 15G to 15J are displayed to make it possible to set a file registration option. The following registration options may be settable. Namely, the registration option includes sharing of document (access right is given to all members), history management (file history is managed), registration expiration date (expiration date of the file to be stored is set), mail distribution (mail attached to the file is distributed simultaneously with the registration of the file), acknowledgement (mail with a link of the file is distributed to all members set in the ACL of the relevant file simultaneously with saving the file, and when the member receives the mail and accesses the link destination, acknowledgement mail is sent thereto), registration state information notification ("registration state information mail" is set to be transmitted simultaneously with saving the file, and when there is an operation of the relevant file, such mail is notified to all members set in the ACL), and the like.

An explanation will be next given of the function of "print from MFP." The function of "print from MFP" is a function that prints a file saved in the file storage section 113 of the document management server 5 or a file saved on the memory card 21 onto a storage media such as paper by the printing section 18 of the MFP 1.

Figure 17:
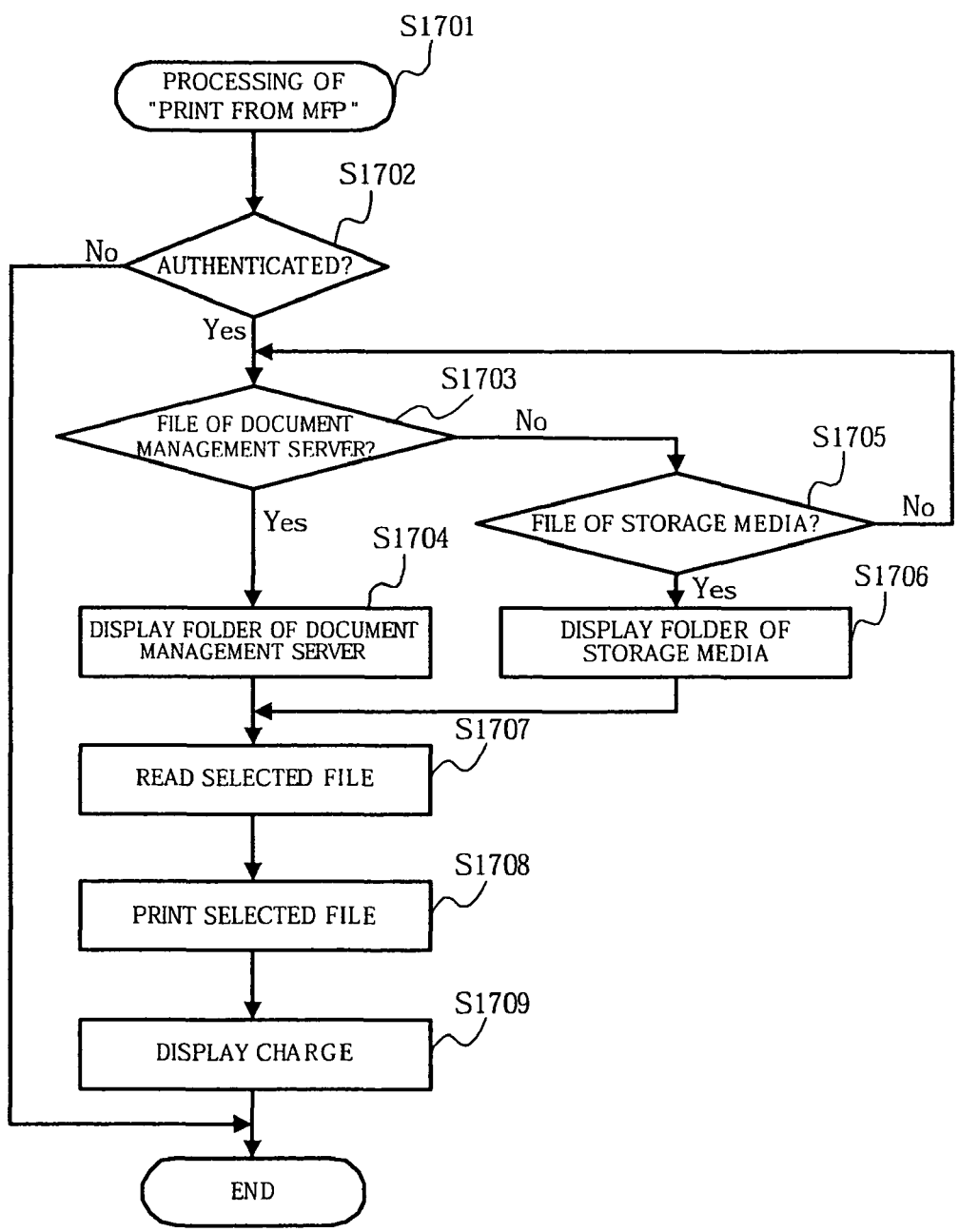
FIG. 17 is a flowchart explaining the processing of "print from MFP"

The following will explain the function of "print from MFP" of the MFP 1 using FIG. 17.

When detecting that "print from MFP" is selected on the aforementioned function selection screen (FIG. 15C), the control section 10 starts the flow of FIG. 17 (step S1701), and determines whether authentication is OK by authentication processing using the authentication screen of FIG. 15D (step S1702). Then, when authentication is OK (step S1702: Yes), the MFP 1 displays a screen for selecting a location where the file is saved on the display. The user operates this screen to make it possible to select whether (a) the electronic file saved in the file storage section 113 of the document management server 5 should be printed or (b) the electronic file saved on the storage media attached to the MFP 1 should be printed.

When "the electronic file saved in the document management server" is selected (step S1703: Yes), the MFP 1 gains access to the saving location of the selected file and displays folder information of the storage destination (step S1704). On the other hand, when "storage media" is selected (step S1703: No and step S1705: Yes), the MFP 1 gains access to the attached storage media and displays folder information of the storage destination (step S1706). In addition, when neither "electronic file saved in the document management server" nor "storage media" is selected (step S1705: No), the MFP 1 returns the screen to the screen displayed after authentication is OK.

After that, when the user selects a certain folder from among the folders displayed in step S1703 or step S1705, the MFP 1 reads (A) the file saved in the selected folder of the document management server 5 or (B) the file saved on the storage media attached to the MFP 1 (step S1707). Then, the MFP 1 prints the file (step S1708). After printing the electronic file, the MFP 1 receives billing information from the document management server 5 and displays a charge on the display screen (step S1709).

At the time of using the function of "print from MFP", when the file is selected, a setting screen for printing conditions may be displayed to set the file printing conditions. The following printing conditions may be settable. Namely, the printing condition includes a color selection (monochrome printing or color printing), the number of sets (the number of paper sheet to be printed), layout (one page is printed in one page or multiple pages are printed in one page), print size (automatic or each paper is selected), print surface (singe-side printing or duplex printing), and the like.

An explanation will be next given of the function of "delete from MFP." The function of "delete from MFP" is a function that deletes a file saved in the document storage server 5 or an electronic file selected after accessing the file saved on the storage media attached to the MFP 1.

Figure 18:
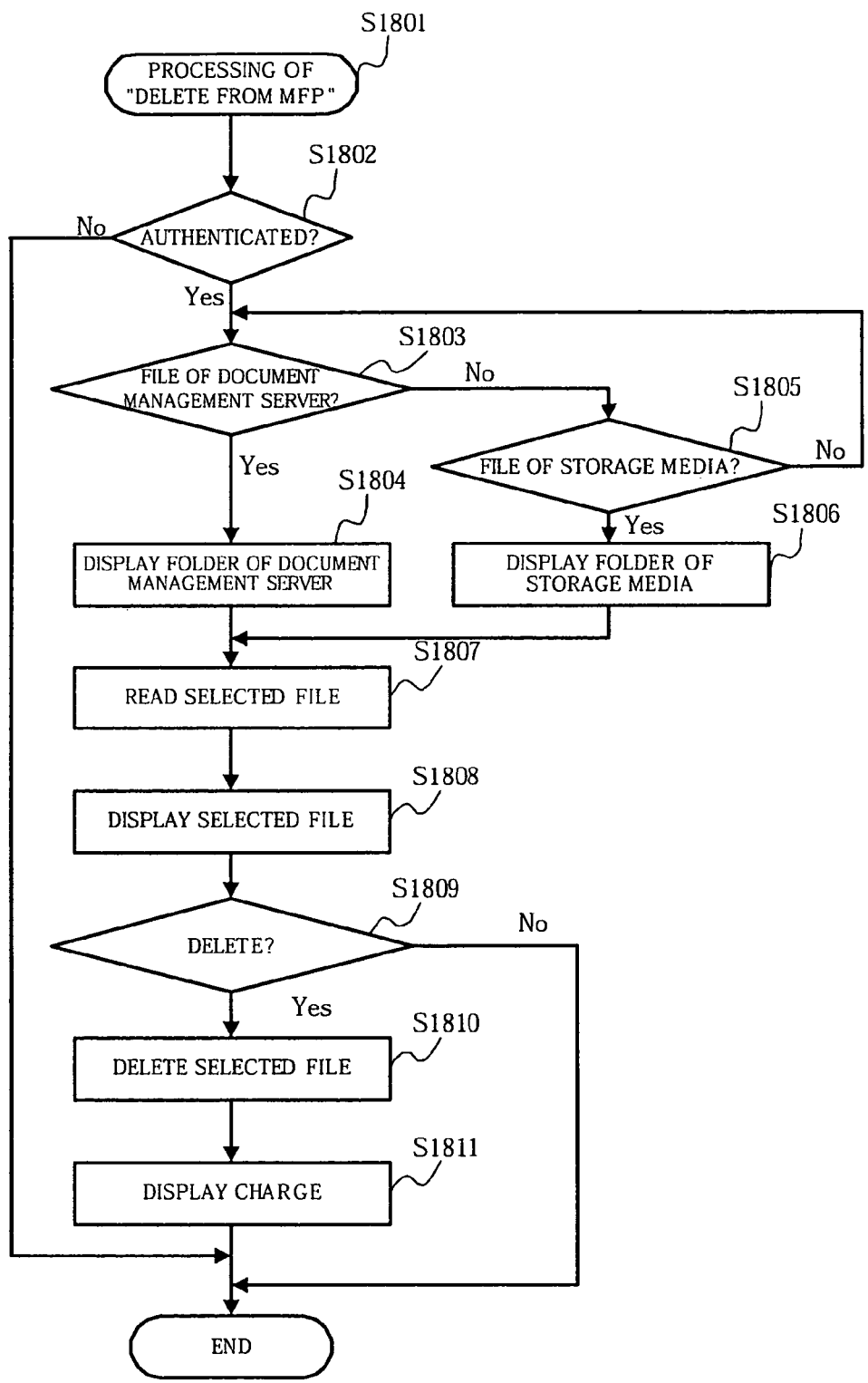
FIG. 18 is a flowchart explaining the processing of "delete from MFP"

The following will explain the function of "delete from MFP" of the MFP 1 using FIG. 18.

When detecting that "delete from MFP" is selected on the aforementioned function selection screen (FIG. 15C), the control section 10 starts processing of FIG. 18 (step S1801), and determines whether authentication is OK (step S1802). Then, when authentication is OK (step S1802: Yes), the MFP 1 displays a screen for selecting a location where the file is saved on the display. From this screen, it is selected whether (a) the file saved in the document management server 5 should be deleted or (b) the file saved on the storage media attached to the MFP 1 should be deleted.

When "the electronic file saved in the document management server" is selected (step S1803: Yes), the MFP 1 gains access to the saving location of the selected file and displays folder information of the storage destination (step S1804). On the other hand, when "storage media" is selected (step S1803: No and step S1805: Yes), the MFP 1 gains access to the attached storage media and displays folder information of the storage destination (step S1806). In addition, when neither "electronic file saved in the document management server" nor "storage media" is selected (step S1805: No), the MFP 1 returns the screen to the screen displayed after authentication is OK.

After that, when the user inputs a folder selection, the MFP 1 reads (A) the file saved in the selected folder of the document management server 5 or (B) the file saved on the storage media attached to the MFP 1 (step S1807). Moreover, the MFP 1 displays the contents of the file by previewing (step S11808). Then, the MFP 1 determines whether an instruction to delete the file is received (step S1809). After that, when determining that an instruction to delete the file is received (step S1809: Yes), the MFP 1 deletes the instructed file (step S1810). After deleting the relevant electronic file, the MFP 1 receives billing information from the document management server 5 and displays a charge on the display screen (step S1811).

An explanation will be next given of the function of "reference from MFP." "Reference from MFP" is a function that displays an electronic file saved in the document management file 5 or the storage media attached to the MFP 1 on the display section of the MFP 1.

Figure 19:
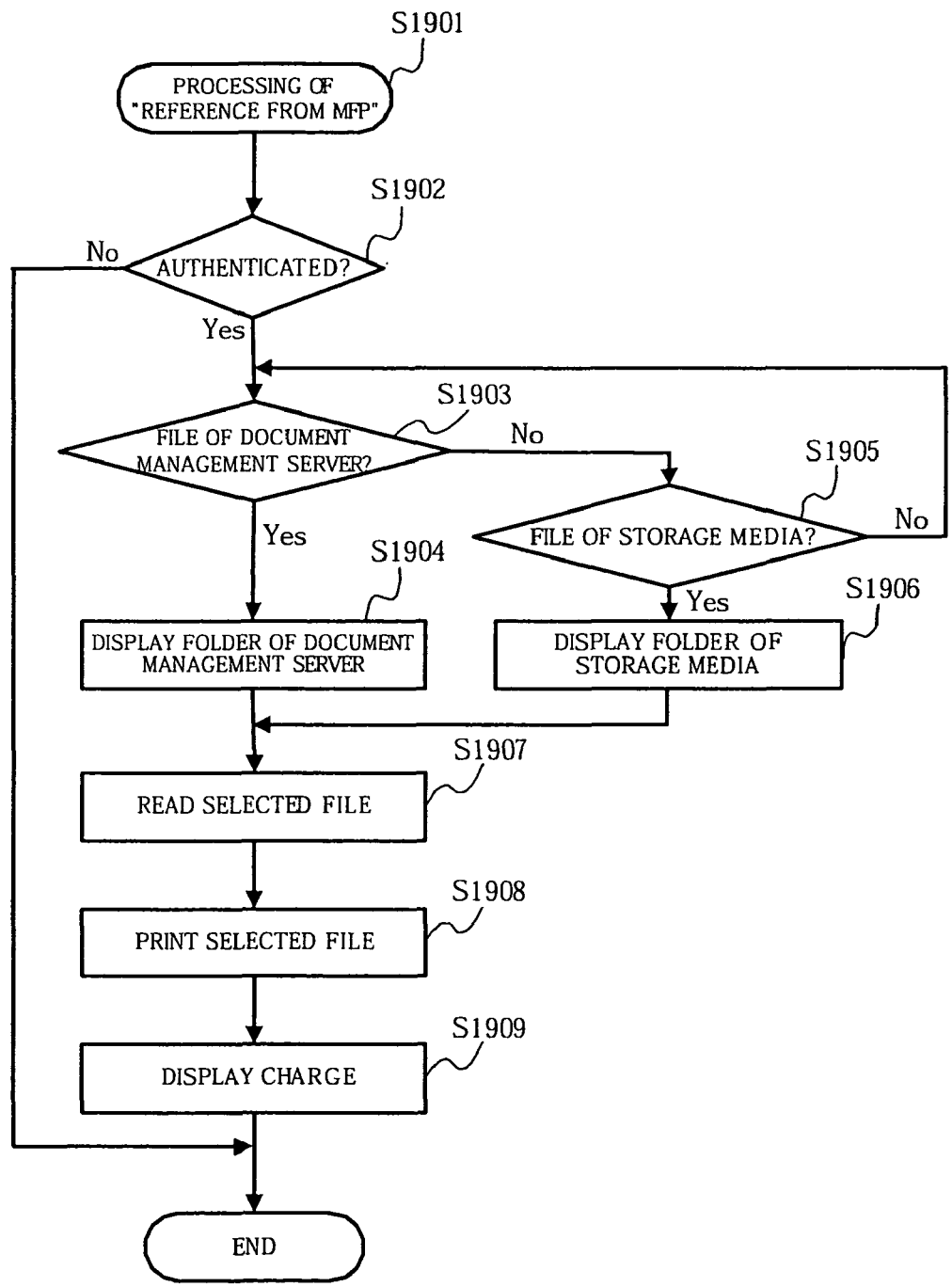
FIG. 19 is a flowchart explaining the processing of "reference from MFP"

The following will explain the function of "reference from MFP" of the MFP 1 using FIG. 19.

When detecting that "reference from MFP" is selected on the aforementioned function selection screen, the control section 10 starts processing (step S1901), and determines whether authentication is OK (step S1902). Then, when authentication is OK (step S1902: Yes), the MFP 1 displays a screen for selecting a location where the file is saved on the display. From this screen, the user can select whether (a) the file saved in the document management server 5 should be referenced or (b) the file saved on the storage media attached to the MFP 1 should be referenced. It is noted that when authentication is not OK (step S1902: No), "reference processing from MPF" is ended.

When "the electronic file saved in the document management server" is selected (step S1903: Yes), the MFP 1 gains access to the saving location of the selected file and displays folder information of the storage destination (step S1904). On the other hand, when "storage media" is selected (step S1903: No and step S1905: Yes), the MFP 1 gains access to the attached storage media and displays folder information of the storage destination (step S1906). In addition, when neither "electronic file saved in the document management server" nor "storage media" is selected (step S1905: No), the MFP 1 returns the screen to the screen displayed after authentication is OK.

After that, when detecting that the folder is selected, the control section 10 reads (A) the file saved in the selected electronic folder of the document management server 5 or (B) the file saved on the storage media attached to the MFP 1 (step S1907). Moreover, the MFP 1 displays the contents of the file by previewing (step S1908). After displaying the contents of the file, the MFP 1 receives billing information from the document management server 5 and displays a charge on the display screen (step S1909).

At the time of using the function of "reference from MFP", when (a) "reference to the file saved in the document management server" is selected, various kinds of setting screens that can set the file saved as illustrated in FIGS. 15G to 15J are displayed to make it possible to set a file registration option. The same registration option as used in the function of "registration from MFP" can be set. Namely, sharing of document, history management, registration expiration date, mail distribution, acknowledgement, registration state information notification, and the like may be set.

An explanation will be next given of the function of "extract from MFP." "Extract from MFP" is a function that saves the file saved in the document management server 5 in the storage media attached to the MFP 1.

Figure 20:
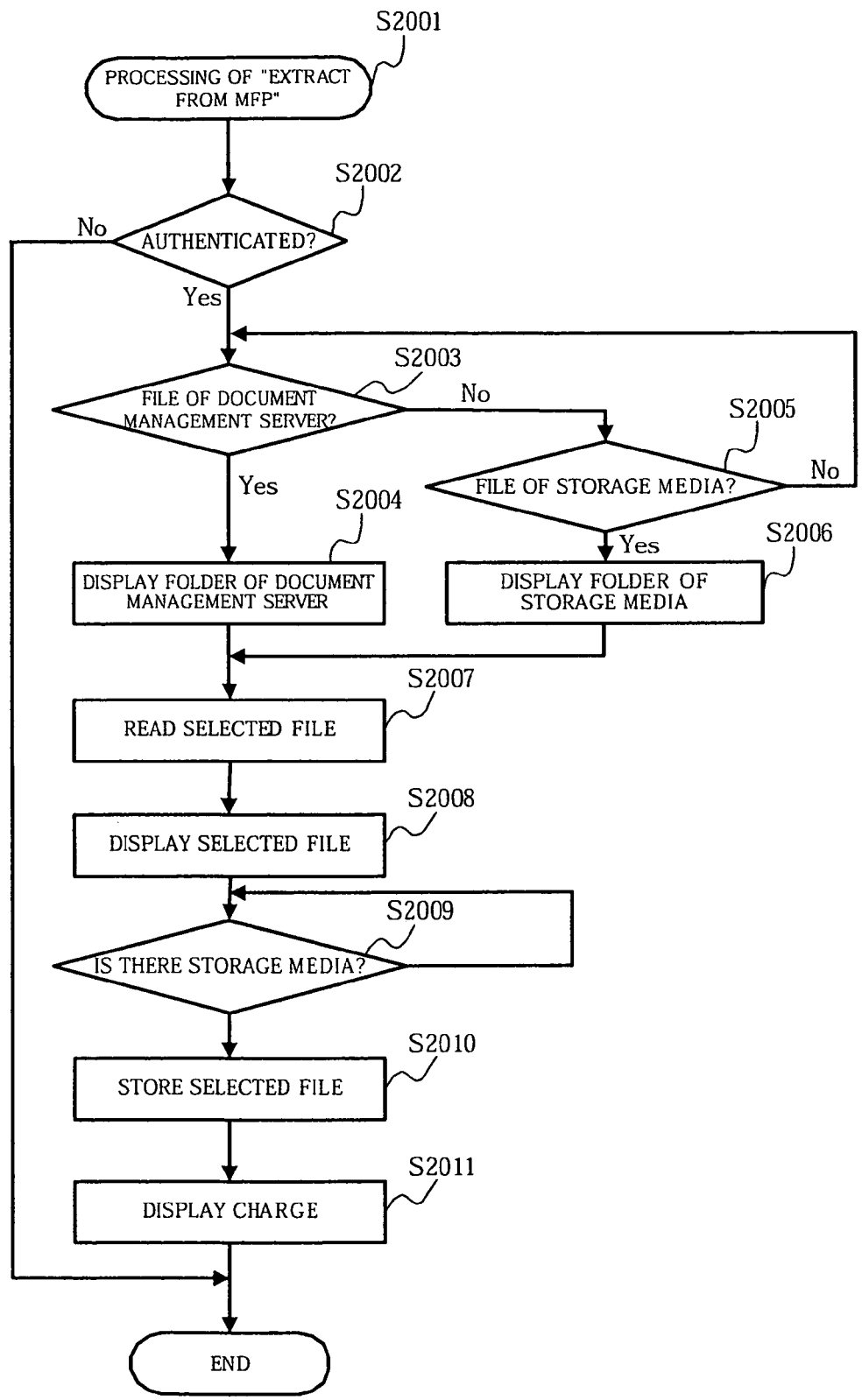
FIG. 20 is a flowchart explaining the processing of "extract from MFP"

The following will explain the function of "extract from MFP" of the MFP 1 using FIG. 20.

When detecting that "reference from MFP" is selected on the aforementioned function selection screen, the control section 10 starts processing of "extract from MFP" (step S2001), and determines whether authentication is OK (step S2002). Then, when determining that authentication is OK (step S2002: Yes), the MFP 1 gains access to the document management server 5 and displays folder information.

When "the electronic file saved in the document management server" is selected (step S2003: Yes), the MFP 1 gains access to the saving location of the selected file of the document management server 5 and displays folder information of the storage destination (step S2004). On the other hand, when "storage media" is selected (step S2003: No and step S2005: Yes), the MFP 1 gains access to the attached storage media and displays folder information of the storage destination (step S2006). In addition, when neither "electronic file saved in the document management server" nor "storage media" is selected (step S2005: No), the MFP 1 returns the screen to the screen displayed after authentication is OK.

After that, when a folder selection is input, the MFP 1 reads (A) the electronic file saved in the selected electronic folder of the document management server 5 or (B) the electronic file saved on the storage media attached to the MFP 1 (step S2007). Moreover, the MFP 1 displays the contents of the electronic file by previewing (step S2008). When it is selected that the file is obtained after displaying the contents of the file (step S2009: Yes), the control section 10 of the MFP 1 determines whether the storage media that stores the file is attached (step S2010). Then, when the control section 10 of the MFP 1 determines that the media is attached (step S2010: Yes), the MFP 1 goes to the next step. On the other hand, when the control section 10 of the MFP 1 determines that no media is attached (step S2010: No), the MFP 1 returns the screen to the screen for determining whether the media is attached. After that, the MFP 1 receives billing information from the document management server 5, displays a charge on the display screen, and stores the electronic file whose obtainment is selected in step S2009 in the storage media (step S2011).

After the MFP 1 receives billing information of any of the functions (services) of "register", "print", "delete", "reference", and "extract", and displays the charge on the display screen, the document management server 5 performs logoff.

An explanation will be next given of the procedure of using the document management server 5 from the computer 3.

First of all, an explanation will be given of processing from start-up of software to selection of each function.

(Login)

The user starts up the software of the document management system installed to the computer 3. Then, the computer 3 displays a login screen and a password input screen, and waits for an input of login information. For example, when the screen for authenticating the user is displayed on a monitor connected to the computer 3, namely, login information, that is, "user ID", and "password" are input, the computer 3 transmits the relevant login information to the document management server 5, and waits for an authentication result. When receiving that authentication is OK, the computer 3 displays the function selection screen as illustrated in, for example, FIG. 15B on the monitor. In addition, when receiving a notification that authentication is NG, the computer 3 displays a screen that urges the user to input login information without displaying the screen for operating the function.

(Function Selection)

When receiving a notification that authentication is OK, the computer 3 displays a function selection screen on the display and waits for user input. On the function selection screen, there are arranged function buttons for selecting the respective functions of "register", "print", "delete", "reference", and "extract". When each of the function buttons is depressed, function selection information is notified to the document management server 5 via the network 4. After that, the operation screen corresponding to each function to be described later is displayed on the display. The detailed description of each function will be given as follows.

First, the function of "register from PC" will be explained. "Register from PC" is a function that saves a file saved in the computer 3 in the document management server 5.

Figure 21:
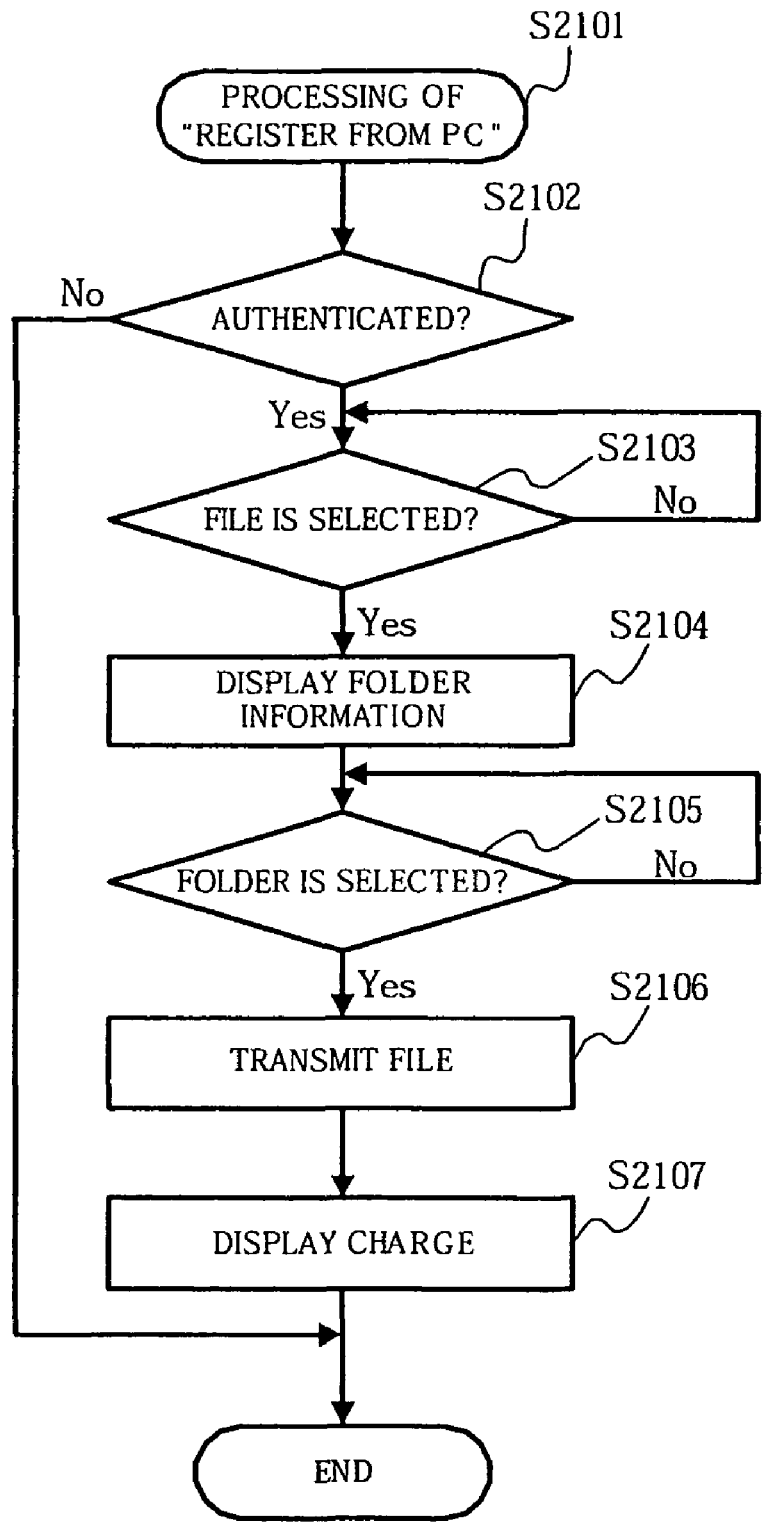
FIG. 21 is a flowchart explaining the processing of "register from PC"

The following will explain the function of "register from PC" of the MFP 1 using FIG. 21.

When "register from PC" is selected on the aforementioned function selection screen, the computer 3 starts processing of "register from PC" (step S2101) and determines whether authentication is OK (step S2102). Then, when authentication is OK (step 2102: Yes), the computer 3 displays a screen for selecting a file in the computer 3. Then, when the file is selected (step S2103: Yes), the computer 3 gains access to the document management server 5 and displays the folder of the document management server 5 (step S2104). After that, the computer 3 determines whether a folder of a storage destination is selected (step S2105). Then, when determining that the folder is selected (step S2105: Yes), the computer 3 transmits the file selected in step S2103 to the folder of the document management server 5 selected in step S2105 (step S2106). After transmitting the file, the computer 3 receives billing information from the document management server 5 and displays the received billing information on the display screen (step S2107).

In addition, at the time of using the function of "register from PC", various kinds of setting screens that can set the saved file to make it possible to set a file registration option, similar to the aforementioned "register from MFP." The following registration options may be settable. Namely, the registration option includes sharing of document (access right is given to all members), history management (file history is managed), registration expiration date (expiration date of the file to be stored is set), mail distribution (mail attached to the file is distributed simultaneously with the registration of the file), acknowledgement (mail with a link of the file is distributed to all members set in the ACL of the relevant file simultaneously with saving the file, and when the member receives the mail and accesses the link destination, acknowledgement mail is sent thereto), registration state information notification ("registration state information mail" is set to be transmitted simultaneously with saving the file, and when there is an operation of the relevant file, such mail is notified to all members set in the ACL), and the like.

Moreover, when the history management is selected as the registration option, the history of the file saved in the document management server 5 can be managed. In other words, at the time of registering the aforementioned selected file, when a predetermined operation (for example, a right click of a mouse) is input in a state that the file saved in the document management server 5 is selected, a list of the document history is displayed.

An explanation will be next given of the function of "reference from PC." "Reference from PC" is a function that displays the file saved in the document management server 5 on the display of the computer 3.

Figure 22:
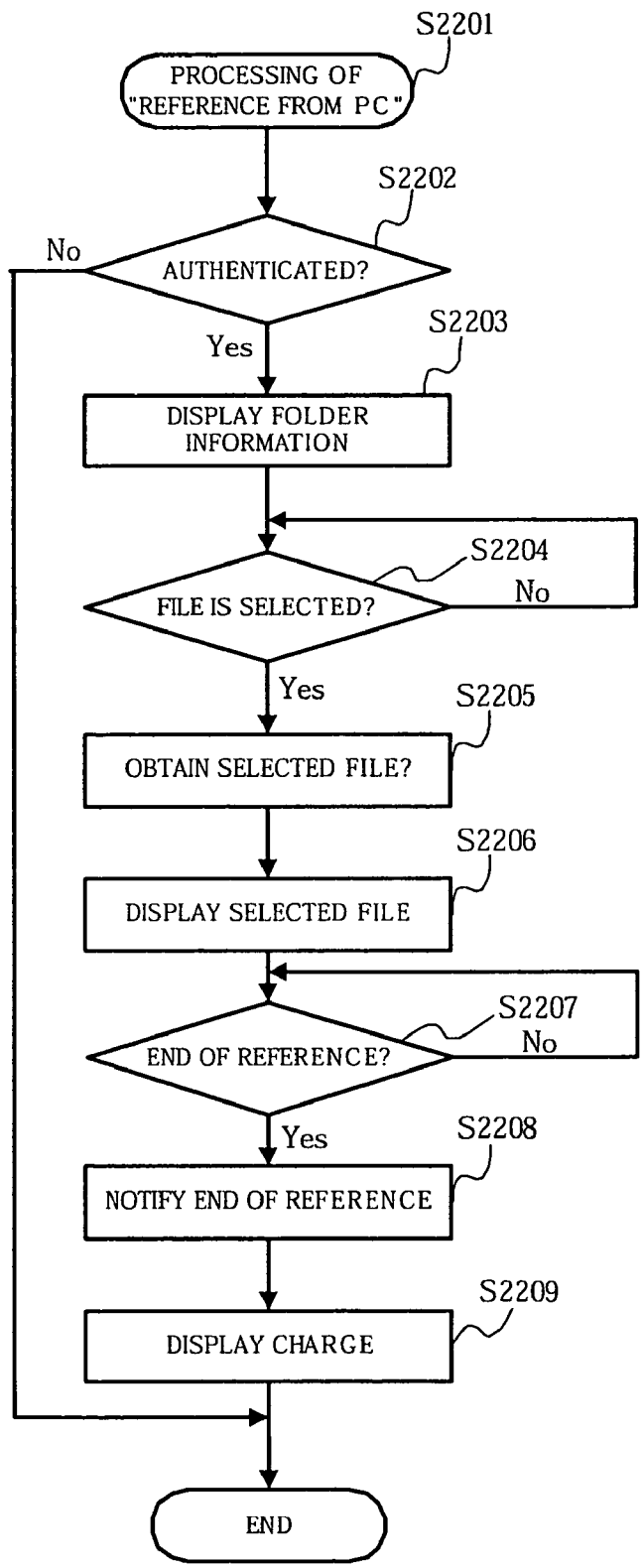
FIG. 22 is a flowchart explaining the processing of "reference from PC"

The following will explain the function of "reference from PC" of the MFP 1 using FIG. 22.

When detecting that "reference from PC" is selected on the aforementioned function selection screen, the computer 3 starts processing of "reference from PC" (step S2201), and determines whether authentication is OK (step S2202). Then, when determining that authentication is OK (step 2202: Yes), the computer 3 displays a screen for selecting a file. Namely, the MFP 1 displays a list of referential electronic folders authenticated in step S2202 (step S2203). On the other hand, when determining that authentication is NG (step S2202: No), processing of "reference from PC" is ended. Then, the computer 3 determines whether the file is selected (step S2204). After that, when determining that the file is selected (step S2204: Yes), the computer 3 obtains the file from the document management server 5 (step S2205). On the other hand, when determining that no file is selected (step S2204: No), the computer 3 returns the screen to the file selection screen. Then, the computer 3 starts up software such as a predetermined viewer to display the contents of the file obtained in step S2205 (step S2206). The computer 3 determines whether a signal indicating the end of file reference is received (step S2207). Then, when determining that the signal indicating the end of file reference is received (step S2207: Yes), the computer 3 notifies the document management server 5 of the end of file reference (step S2208). On the other hand, when determining that no signal indicating the end of file reference is received (step S2207: No), the computer 3 returns the screen to the file contents displaying screen. After that the computer 3 receives billing information from the document management server 5 and displays a charge on the display screen (step S2209).

Additionally, at the time of using the function of "reference from PC", various kinds of setting screens that can set the file as illustrated in FIGS. 15G to 15J are displayed. The same registration option as used in the aforementioned function of "registration from PC" can be set. Namely, sharing of document, history management, registration expiration date, mail distribution, acknowledgement, registration state information notification, and the like may be set. Also, likewise, when the member of organization membership selects the history management as the registration option, he/she can cyclically manage the file saved in the document management server 5. Namely, similar to "the time of registering the file from PC", at the time of referencing the aforementioned selected file, when a predetermined operation (for example, a right click of a mouse) is input in a state that the file saved in the document management server 5 is selected, a list of the document history is displayed.

An explanation will be next given of the function of "extract from PC." "Extract from PC" is a function that saves the file saved in the document management server 5 in the computer 3.

Figure 23:
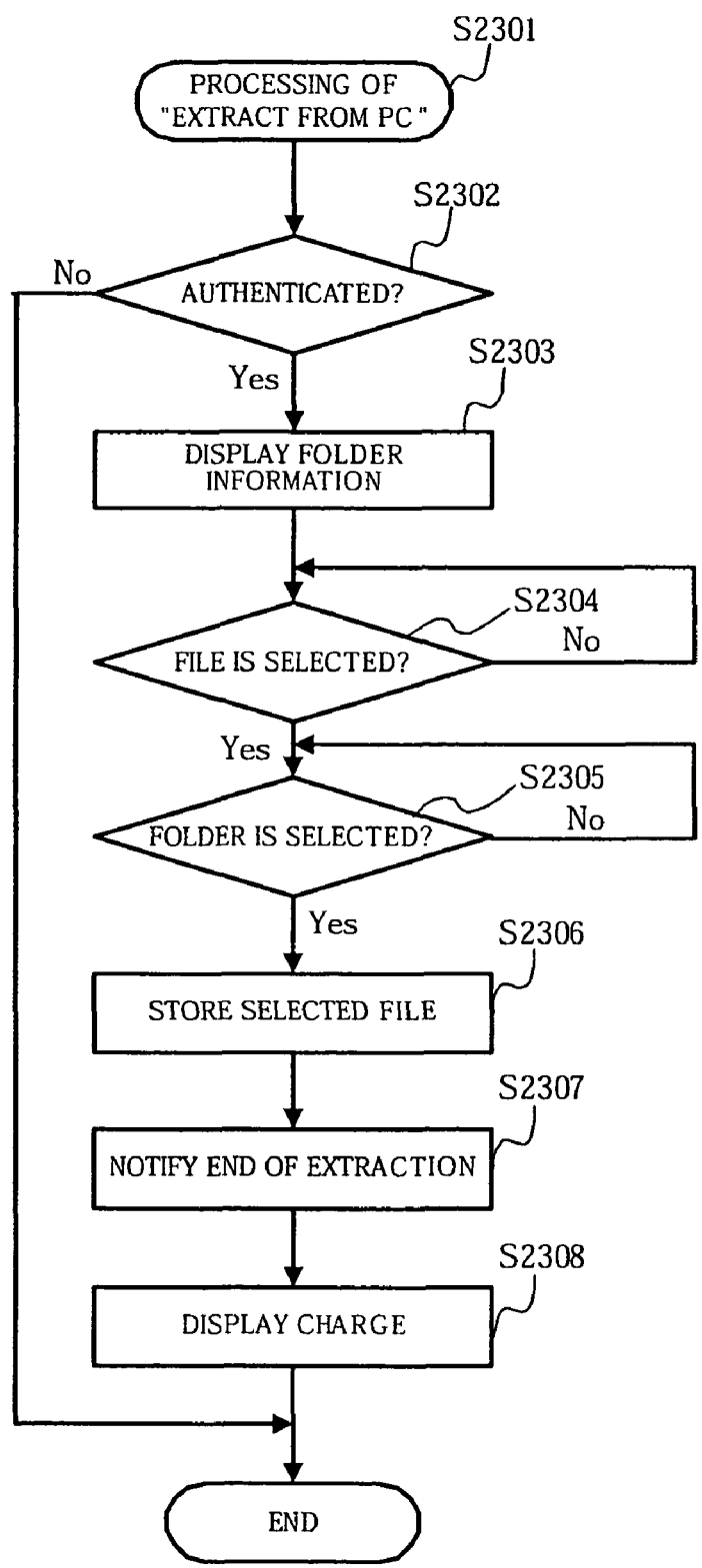
FIG. 23 is a flowchart explaining the processing of "extract from PC"

The following will explain the function of "extract from PC" of the MFP 1 using FIG. 23.

When detecting that "extract from PC" is selected on the aforementioned function selection screen, the computer 3 starts processing of "extract from PC" (step S2301), and determines whether authentication is OK (step S2302). Then, when determining that authentication is OK (step 2302: Yes), the computer 3 accesses the document management server 5 and displays folder information (step S2303). On the other hand, when determining that authentication is NG (step S2302: No), processing of "extract from PC" is ended. Sequentially, the computer 3 displays a screen for selecting a file. Namely, the MFP 1 displays a list of referential folders authenticated in step S2302. Then, the computer 3 determines whether the file is selected (step S2304). After that, when determining that the file is selected (step S2304: Yes), the computer 3 displays a screen where a folder that stores the file can be selected or receives an input of a folder of a storage destination, to determine whether any such folder is selected (step S2305). On the other hand, when determining that no file is selected (step S2304: No), the computer 3 returns the screen to the file selection screen. When determining that a folder is selected (step S2305: Yes), the computer 3 stores the file in the folder selected from the document management server 5 (step S2306). On the other hand, when determining that no folder is selected (step S2305: No), the computer 3 returns the screen to the folder selection screen. After obtaining the relevant electronic file, the computer 3 notifies the document management server 5 of the completion of obtaining the file (step S2307). After that, the computer 3 receives billing information from the document management server 5 and displays a charge on the display screen (step S2308).

An explanation will be next given of the function of "delete from PC." "Delete from PC" is a function that deletes the file saved in the document management server 5.

Figure 24:
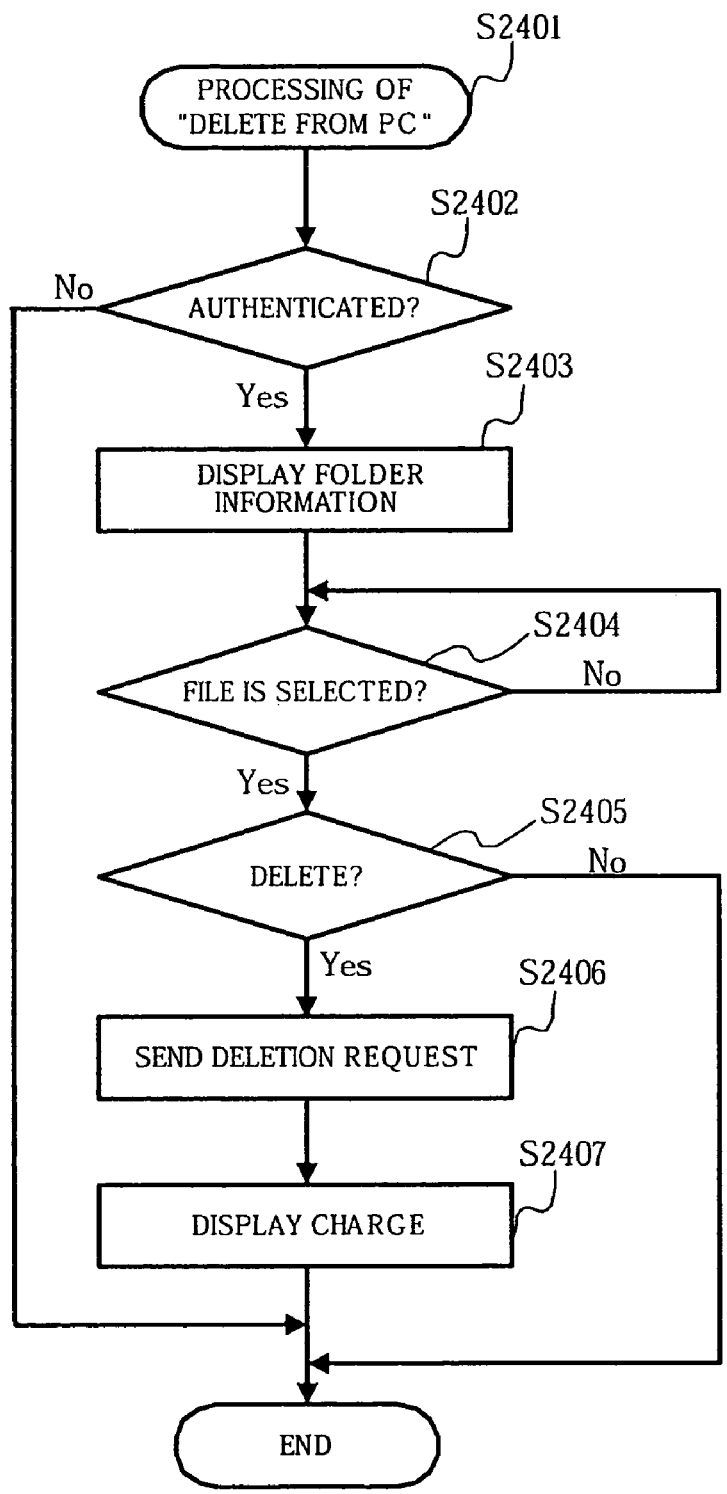
FIG. 24 is a flowchart explaining the processing of "delete from PC"

The following will explain the function of "delete from PC" of the MFP 1 using FIG. 24.

When detecting that "delete from PC" is selected on the aforementioned function selection screen, the computer 3 starts processing of "delete from PC" (step S2401), and determines whether authentication is OK (step S2402). When determining that authentication is OK (step 2402: Yes), the computer 3 accesses the document management server 5 and displays folder information (step S2403). On the other hand, when determining that authentication is NG (step S2402: No), processing of "delete from PC" is ended. Sequentially, the computer 3 displays a screen for selecting a file. Namely, the MFP 1 displays a list of referential folders authenticated in step S2402. Then, the computer 3 determines whether the file is selected (step S2404). When determining that the file is selected (step S2404: Yes), the computer 3 displays a screen for confirming whether the file should be really deleted and waits for user input. Then, the computer 3 determines whether deletion on the confirmation screen is designated (step S2405), and when determining that the deletion is designated (step S2405: Yes), the computer 3 sends a request for deleting the file to the document management server 5 (step S2406). Then, after the relevant electronic file is deleted by the document management server 5, the computer 3 receives billing information from the document management server 5 and displays a charge on the display screen (step S2407). On the other hand, when determining that the deletion is not designated (step S2405: No), the computer 3 ends the processing of "delete from PC."

(Logoff)

When receiving billing information of each of services of "register", "print", "reference", and "extract", the computer 3 displays the function selection screen shown in FIG. 15C and waits for user operation. When the user desires to log off, software may be ended.

In addition, the document management server 5 in the present document management system includes an authentication section that authenticates a member of the membership organization, and provides authentication to the user of the computer 3 when the user uses each function (register, reference, print) of the document management system. This makes it possible for the document management server 5 to obtain the history of using information of the member of the membership organization and suitably charge the membership organization.

For example, at the time of registering the file to the document management server 5 and printing the file, when the user uses each function of registration and printing, the document management server 5 generates billing information for each function of registration and printing. Also, even in a case where the storage media is attached to the MFP 1 and the file saved in the storage media is printed, when the print function is selected from the computer 3, authentication to the document management server 5 is performed.

Moreover, in the case where the print function is used by the MFP 1, when printing of all pages is completed, the MFP 1 sends a notification indicating the completion of print function to the document management server 5. When receiving the notification of completion, the document management server 5 generates billing information. As mentioned above, since billing information is not generated every time when a page is printed, printing is performed speedily. However, when the network cable of the MFP 1 is disconnected in the course of operation, a charge cannot be appropriately made. In order to prevent this problem, when printing of each page is completed, the MFP 1 may send a notification indicating the completion of page printing to the document management server 5. This makes it possible to appropriately make a charge although the printing speed drops.

Moreover, for example, when the document management system is used from the computer 3, a standard browser installed into the computer 3 is not used. Dedicated software using the present document management system is provided. This is because the document managing server 5 obtains situations where the computer 3 uses each function of the document management system to make a charge for each function at the time of using each function.

Still moreover, at the time of using the "reference" function, when the reference function is completed, the computer 3 sends a notification indicating the completion of reference function to the document management server 5. The document management server 5 generates billing information upon reception of the notification of completion. However, when the reference function is used for a long time, for example, the MFP 1 will be occupied. In order to prevent this problem, the MFP 1 may send a notification to the document management server 5 every utilization time of the reference function (for example, every 10 seconds) to make a charge according to the utilization time of the reference function.

Furthermore, time for which the reference function can be used may be limited (for example, up to three minutes). Still furthermore, the reference function may be ended when the operation (for example, movement, rotation, enlargement, reduction, etc.) of the reference function is not input for a fixed time (for example, up to three minutes).

An explanation will be next given of a preferable embodiment of the function of "register from MFP."

An explanation will be given of error processing when the function of "register from MFP" in connection with the file from the MFP 1 is set and "mail distribution" is set as the registration option.

When detecting an error (e.g., file transmission is interrupted during transmission) in saving the file in the document management server 5 using the function of "register from MFP", the document management server 5 sends a notification indicating error to the MFP 1.

Moreover, when detecting the presence of an error, for example, "Request timeout", the mail distribution manger of the document management server 5 accesses the membership list manager and obtains an e-mail address corresponding to the member who has set the option of "mail distribution." Then, the mail distribution manger of the document management server 5 creates mail for notifying a transmission destination where an error occurs (e.g., a mail distribution to a transmission destination cannot be made, etc.) and sends the created mail and e-mail address information to the mail server. This configuration makes it possible to appropriately notify an error message to the user.

An explanation will be next given of a preferable embodiment of the function of "reference from MFP."

The displayed contents can be rotated every 90 degrees at the time of referring to the displayed contents on LCD 22 of the MFP 1. A method for rotating the displayed contents at 90 degrees may be carried out by the application installed into the MFP 1 or the image processor that handles secondary data. However, the method can be more efficiently carried out by the image processor since conversion of primary data into secondary data is not needed.

Moreover, a standard for which the displayed contents are rotated at 90 degrees may be either up and down or left and right. However, if the contents are rotated at 90 degrees when they are partially displayed on the display panel, the displayed portion is moved outside of the display panel to make it difficult to view. Accordingly, the standard for 90-degree rotation may be set such that the rotation is made with the center of the portion being currently displayed on the display panel.

It is noted that operations, such as enlargement, reduction, and scroll, of the file displayed on the display panel may be appropriately carried out.

Moreover, at the time of using "reference from MFP" or "print from MFP", when a downloaded file cannot be displayed, information indicating an error may be displayed on the display panel. In this case, the user may determine a file extension (identification information) before the download and display the error on the display panel when the determined file extension is not included in the file extensions handled by the document management system.

Moreover, at the time of using the function of "print from MFP", for example, in the case of a spreadsheet, printing of only the first sheet reduces possibility that useless sheet will be printed. Furthermore, at the time of using the function of "reference from MFP", for example, in the case of a JPEG (Joint Photographic Experts Group) file, if it is intended that only the monochrome display instead of the color display can be selected, the operation is made easy. Still furthermore, at the time of using the function of "print", for example, in the case of a document file, there is a case in which a page is unwantedly printed, so that the number of pages to be printed cannot be estimated. Accordingly, when it is determined that the extension is a document file, the number of paper to be printed may be displayed on the screen in advance or a print preview may be displayed thereon.

An explanation will be next given of a preferable embodiment when the user logins the document management server 5 from the MFP 1 or computer 3.

The MFP 1 or computer 3 may include a simple authentication function. Namely, an OK button for transmission to the document management server 5 is configured not to be displayed unless the predetermined number or more of digits of ID or password is not input. This configuration eliminates useless time consumed when the user erroneously inputs the ID or password to press the OK button and accesses to the document management server 5, and resultantly, the user must wait during this time. Moreover, this makes it possible to reduce the network load.

In the present embodiment, at the time of thus using the service of the document management server 5 from the MFP, (1) service selection (register, reference, print, and the like), and (2) a login are performed in order, and a logoff is forcibly performed after completion of the service. This prevents the user to forget the logoff.

The following will explain processing in which the processing that is executed by the aforementioned "registration state information mail" is further extended (hereinafter referred to as "extended acknowledgement processing").

The "registration state information mail" function is that the operation of the electronic file is notified to the address of each user set in ACL (Access Control List) of the electronic file when the electronic file is operated as mentioned above. However, the document management sever according to this embodiment can notify the user, who is not registered in ACL, of the operation of the electronic file. The following will specifically explain the "extended acknowledgement processing" to be executed by the control section 110 of the document management server 5.

In the file storage section 113 of the document management server 5, the electronic files and the electronic folders are stored as illustrated in FIG. 6A. Then, in each of the electronic files and each of the electronic folders, ACL as shown in FIG. 6B is set to make it possible to restrict the operation to the electronic file and the electronic folder. ACL is stored in the management information storage section 114.

Figure 25:
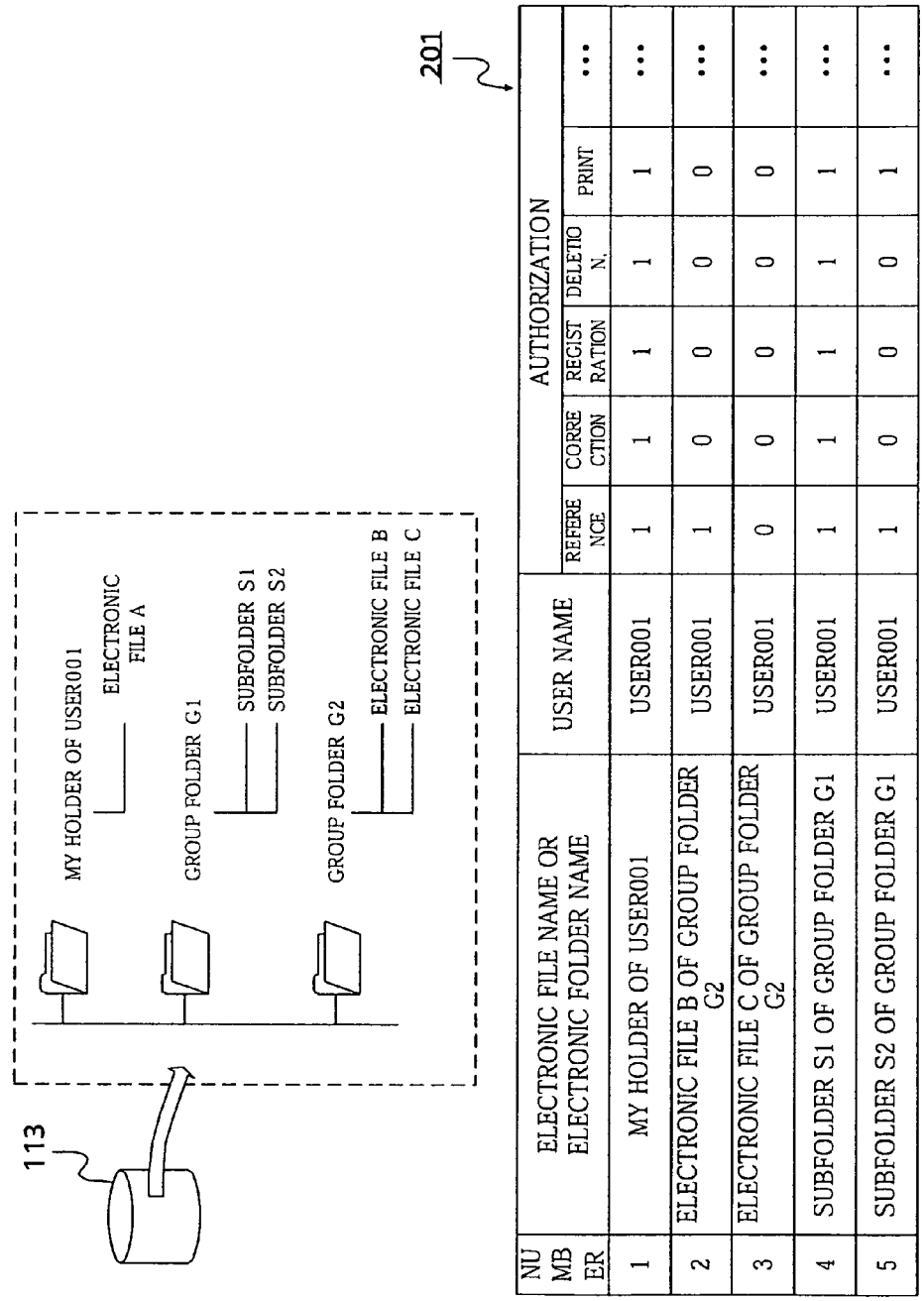
FIG. 25 is a view illustrating an example of information stored in an access control list.

FIG. 25 is a view illustrating an example that further specifically explains information to be stored in ACL shown in FIG. 6B. As in this example, an ACL 201 includes an electronic file name or electronic folder name, a user name, and authorization. The electronic file name or electronic folder name is a name of an electronic file or electronic folder whose operation is to be restricted. The user name is a name of a user whose operation is to be restricted. Authorization is information indicating whether each operation should be permitted for each type of operations (for example, reference, correction, registration, and deletion, print).

For example, in this example, authorization such as number 1 is set to "My folder of USER001" In this case, setting for permitting user USER001 to perform the respective operations of reference, correction, registration, deletion, and print is stored therein (in this example, "1" is described).

On the other hand, authorization such as number 2 is set to "Electronic file B of group folder G2." In this case, setting for permitting the user USER001 to perform only the operation of reference and for prohibiting user USER001 to perform the other operations of correction, registration, deletion, and print is stored therein (in this example, "0" is described).

The user operation authorization can be thus set for each electronic file or electronic folder using ACL.

Figure 26:
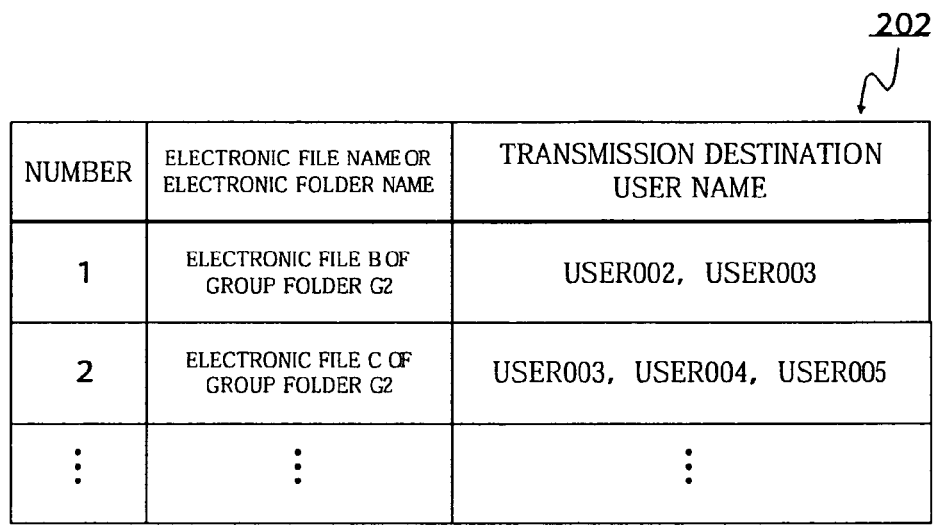
FIG. 26 is a view illustrating an example of information stored in a transmission destination list.

Further, a transmission destination list 202 is stored in the management information storage section 114. The transmission destination list 202 is a list that designates a user of the other party to which a notification of the relevant operation (e.g., reference, correction, registration, deletion, and print) is sent when the operation is performed to the electronic file name or electronic folder name. FIG. 26 is a view illustrating an example of the transmission destination list 202. As illustrated in the example, the transmission destination list 202 includes an electronic file name or electronic folder name, and a transmission destination user name.

It should be noted that the transmission destination list 202 may be included in the ACL 201. In other words, the ACL 201 includes a portion where a transmission destination user name is stored in addition to the electronic file name or electronic folder name, the user name and authorization, and when the operation authorized by ACL 201 is performed, a notification of the operation may be sent to the set transmission destination user. Or, when the user tries the operation that is not authorized by ACL 201, a notification of such try may be sent to the sent transmission destination user.

Furthermore, in the transmission destination list 202, the transmission destination user name may be set for each type of operations. For example, when a certain electronic file is registered, a notification of the registration is sent to the user USER001. On the other hand, when the relevant electronic file is referenced, a notification of the reference is sent to the user USER002. By doing so, the electronic file and electronic folder can be more precisely managed. Moreover, only when specific operation is performed, a notification of the relevant operation can be sent to the set user, making it possible to reduce traffic over the network 4 and load to the document management server 5.

Figure 28:
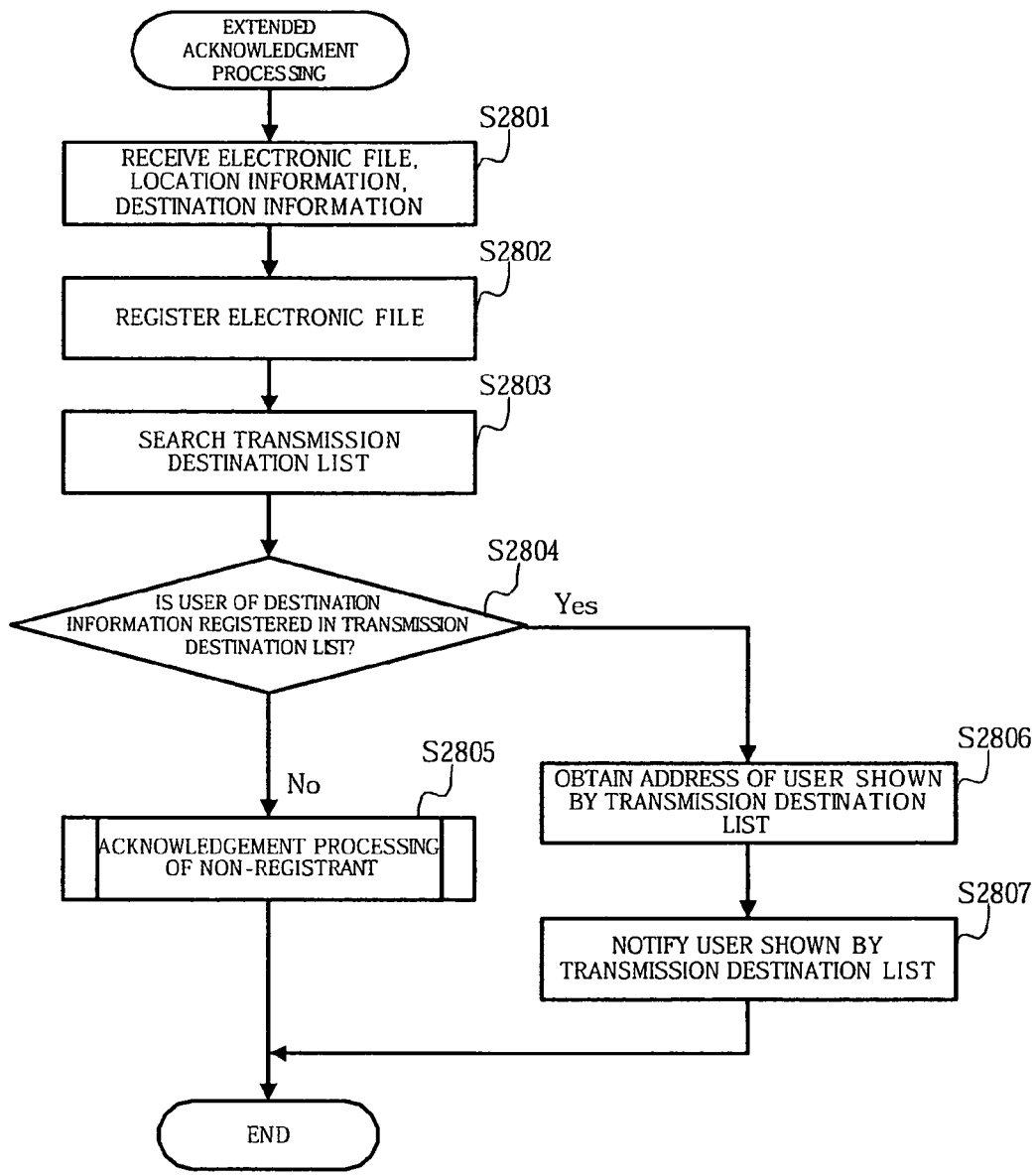
FIG. 28 is a flowchart explaining extended acknowledgement processing.
Figure 29:
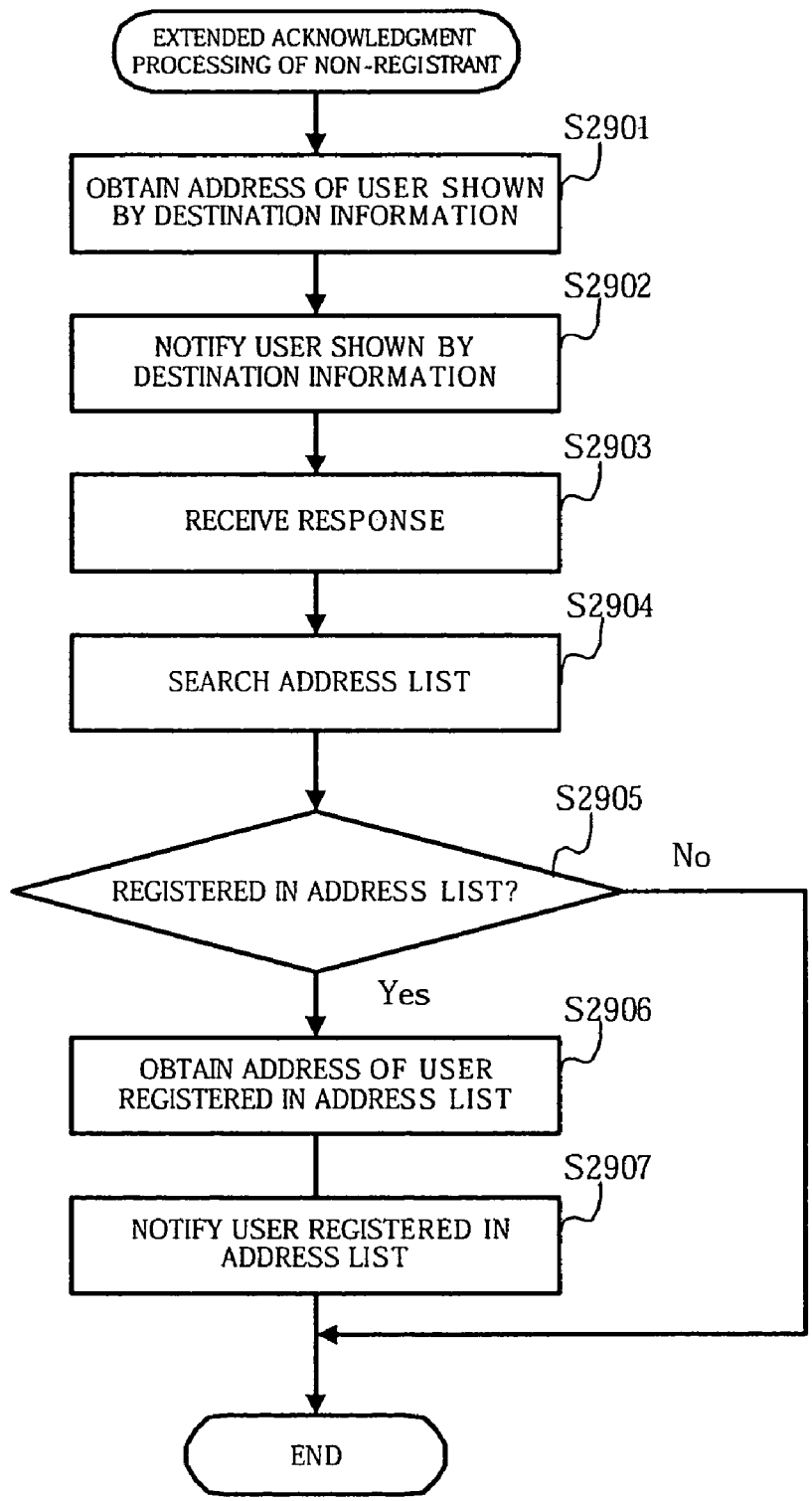
FIG. 29 is a flowchart explaining acknowledgement processing of a non-registrant in the transmission destination list.

An explanation will be next given of the flow of operations of the extended acknowledgement processing to be executed the control section 110 using flowcharts in FIGS. 28 and 29. In the following, an explanation will be given of a case, by way of example, where the electronic file is registered in the document management server 5 from MFP 1 (Multi-Function Peripheral) and general electronic mail is used to send a notification to each user.

First, the user of MFP 1 designates an electronic file, which is to be registered in the document management server 5, location information for designating a location where the electronic file is stored, and destination information of the other party to which the registration of the electronic file is desirably notified. For example, the electronic folder name, which stores the electronic file, is included in location information and the user name of the other party to which a notification is desirably sent is included in destination information. The MFP 1 transmits the electronic file, location information, destination information and a registration command to the document management server 5 over the network 4. The registration command is a command that requests the electronic file to be registered in the file storage section 113 of the document management server 5. The communications section 117 of the document management server 5 receives the electronic file, location information, destination information and registration command over the network 4. The control section 110 receives the electronic file, location information, destination information and registration command from the communications section 117 (step S2801).

The control section 110 registers the received electronic file in the file storage section 113 based on the received location information (step S2802).

The control section 110 next searches whether the user name of a notification destination included in the received destination information is registered in the transmission destination list 202 (step S2803).

When the user name of the notification destination is registered in the transmission destination list 202 (step S2804: Yes), the control section 110 searches the corresponding user name from the company membership list as illustrated in FIG. 8B and obtains a mail address of a notification destination user (step S2806). Then, the control section 110 transmits a notification mail using the obtained mail address as a destination (step S2807). Information, which indicates a storage location of the electronic file registered by the control section 110 in step S2802, is attached to this notification mail. The control section 110 completes the extended acknowledgement processing.

For example, the notification mail transmitted by the control section 110 in step S2802 has a format as illustrated in FIG. 10B. As illustrated in this figure, the notification mail includes link information to the storage location of the electronic file. The notification destination user has authorization to access the electronic file registered in the transmission destination list 202, namely, a registered electronic file and can refer to the registered electronic file if there is link information to the storage location.

In addition, the control section 110 may select a format appropriate for an environment (mail format, type of mailer to be used, etc.) of the computer 3 that is used by the user, who receives the relevant notification mail, as a format of the notification mail to be transmitted in step S2807.

For example, a type of mailer is stored in the company membership list as illustrated in FIG. 8B, in addition to the user ID, password, name, affiliated organization, nickname, billing address, e-mail address, and contact address. Then, in step S2806, the control section 110 obtains a type of mailer in addition to the mail address of the notification destination. Furthermore, the control section 110 selects a mail format appropriate for the environment of the notification destination from the predetermined mail formats based on the obtained mailer type. The, in step S2807, the control section 110 transmits the notification mail based on the selected mail format. In this way, the control section 110 can select a method appropriate for the environment of the computer 3 to be used by the user, and configure the document management system having an excellent operability.

On other hand, if there is no notification destination user name in the transmission destination list 202 (step S2804: No), the control section 110 performs acknowledgment processing for non-registrant in the transmission destination list 202 (step S2805).

In FIG. 29, an explanation will be next given of details on the acknowledgement processing to be executed by the control section 110 in step S2805.

First, the control section 110 searches a user name indicated by destination information from the company membership list shown in FIG. 8B to obtain a mail address of the notification destination user based on destination information received in step S2801 (step S2901). Then, the control section 110 transmits a first notification mail using the obtained mail address as a destination (step S2902). The electronic file received by the control section 110 in step S2801 is attached to the first notification mail.

Figure 30:
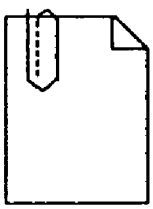
FIG. 30 is a view illustrating an example of a notification mail to be transmitted to a registrant in an access control list from the document management server.

For example, FIG. 30 shows an example of the first notification mail transmitted by the control section 110 in step S2902. The destination of the first notification transmitted in step S2902 is not included in the transmission destination list 202. In other words, the notification destination user of the first notification mail has no access permission to the electronic file stored by the control section 110 in step S2802. For this reason, as in this figure, the registered electronic file is attached to the first notification mail to be transmitted in step S2902. Furthermore, the first notification mail may include ink information to the electronic file stored by the control section 110 in step S2802, but the notification destination user has no access permission, so that the relevant link information is not displayed.

In addition, the control section 110 may select a format appropriate for an environment (mail format, type of mailer to be used, etc.) of the computer 3 that is used by the user, who receives the first notification mail, as a format of the first notification mail to be transmitted in step S2902, similar to step S2807.

Or, in place of the registered electronic file, the first notification mail may have an attached file in which the relevant electronic file is converted to a format that can be read by the computer 3 used by the user, who receives the first notification mail.

For example, the control section 110 attaches one, in which the electronic file registered in the file storage section 113 is encoded in a predetermined format, thereto. On the other hand, the computer 3 decodes the attached electronic file encoded.

In this case, for example, a program for decoding the electronic file in a predetermined format may be preinstalled in the ROM 112 of the document management server 5. Then, upon transmission of the first notification mail, the control section 110 may read the program for encoding the electronic file in the predetermined format, execute the program, encode the electronic file, and attach the resultant file to the first notification mail.

On the other hand, a program for decoding the electronic file in a predetermined format may be preinstalled in the computer 3. Then, upon reception of the first notification mail, the computer 3 may read the program for decoding the electronic fire in the predetermined format, execute the program, and decode the electronic file.

Upon transmission of the first notification mail, the control section 110 receives a response from the transmission destination user of the first notification (step S2903).

For example, FIG. 31A shows an example of a response mail notified to the control section 110 in step S2903. As illustrated in this figure, the response mail includes information in which the notification destination user, to which the control section 110 transmitted the first notification mail in step S2902, receives the attached electronic file and refers to the file.

Figure 27:
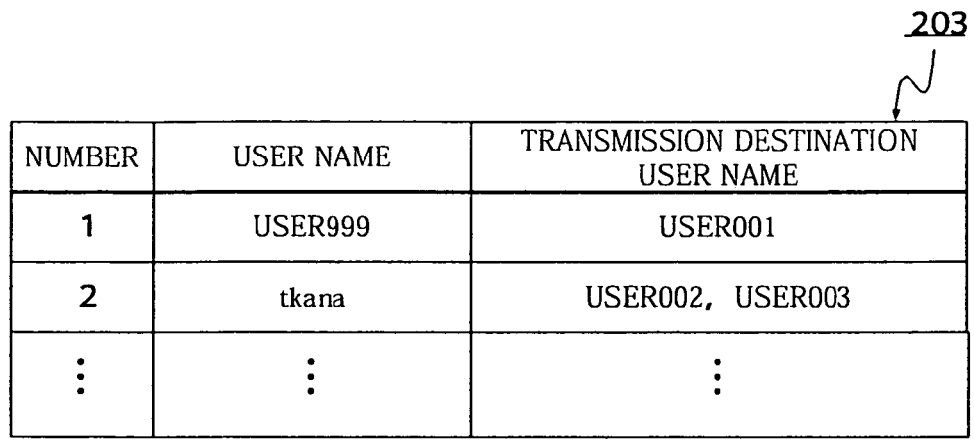
FIG. 27 is a view illustrating an example of information stored in an address list.

Upon reception of the response mail, the control section 110 determines whether the notification destination user is registered in an address list 203 as shown in FIG. 27 (step S2905).

The address list 203 is a list that prestores destination information of a user who transfers the received response mail. For example, in the address list 203 in FIG. 27, it is set that the response mail is transferred to two users of user name "USER002" and user name "USER003" when the response mail is received from a user having a user name "tkana."

If the notification destination user is registered in the address list 203 (step S2905: Yes), the control section 110 obtains a mail address of the notification destination user registered in the address list 203 from the company membership list as shown in FIG. 8B (step S2906). Then, the control section 110 transmits a second notification mail using the obtained mail address as a destination (step S2907). Information, which indicates a storage location of the electronic file registered by the control section 110 in step S2802, is attached to the second notification mail. Then, the control section 110 completes the extended acknowledgement processing.

For example, FIG. 31B is an example of the second notification mail that is notified to the notification destination user registered in the address list 203 shown in FIG. 27 in step S2907. As illustrated in this figure, the second notification mail includes information in which the user of the other party (user name "tkana"), to which the control section 110 transmitted the first notification mail, receives the attached electronic file and refers to the file. Then, the destination of the second notification mail is the users registered in the address list 203 (user names "USER002" and "USER003").

On the other hand, if the notification destination user is not registered in the address list 203 in step S2905 (step S2905: No), the control section 110 does not transmit the second notification mail.

It should be noted that the address list 203 may be included in the ACL 201. In other words, the ACL 201 includes a portion where the transmission destination user name is stored in addition to the electronic file name or electronic folder name, the user name and authorization, and the control section 110 may obtain second destination information set in the ACL 201 and transmit the second notification mail.

The control section 110 thus performs extended acknowledgment processing. Then, acknowledgment processing allows acknowledgement to be notified to even the user who is not registered in the ACL 201.

In the foregoing embodiment, an example has been provided in a case where the electronic file is registered in the document management server 5 from the user of the MFP1. However, it is needless to say that the present invention is applicable to a case where the operations except the registration (for example, reference, correction, deletion, print) are performed.

Moreover, in the foregoing embodiment, an example has been provided in a case where general electronic mail is used to send the notification to each user. However, other messaging services through the computer may be used.

Figure 32:
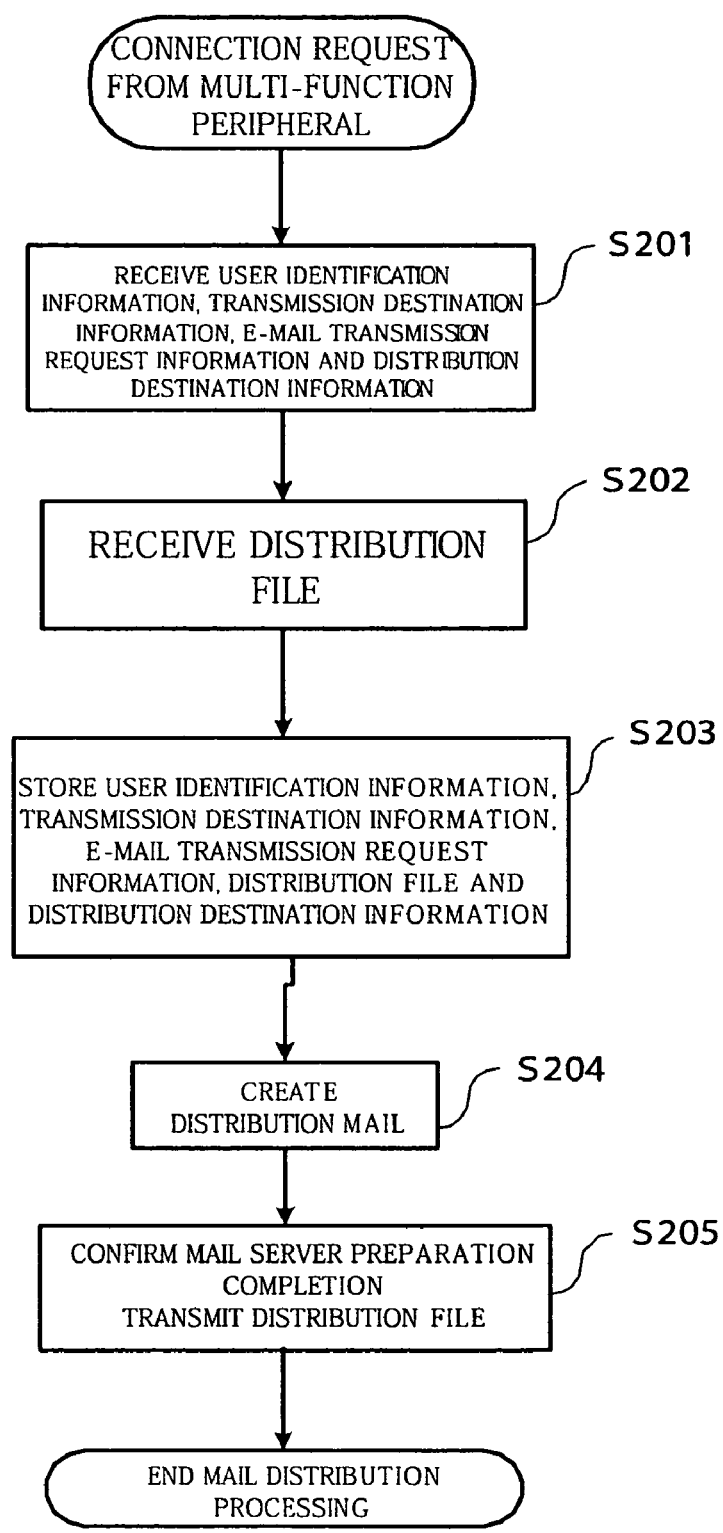
FIG. 32 is a flowchart explaining a "mail distribution" processing operation.

An explanation will be next given of an operation of the document management server 5, which executes mail distribution processing according to the "mail distribution" of the present embodiment with reference to a flowchart of FIG. 32. The mail distribution processing is started according to a request for connection to the Web server connected to the document management server 5 from the MFP 1 when the user inputs address information of a desired transmission destination by the MFP 1. The Web server is a server that saves a file whose reference, correction, etc., for example, are to be notified with respect to the input transmission destination address.

Then, after success of connection to the Web server, the document management server 5 receives user ID (user identification information) input by the user using the MFP 1, an e-mail address (hereinafter referred to as transmission destination information) corresponding to the user ID, e-mail transmission request information, and an e-mail address of a distribution destination of a distribution file (hereinafter referred to as distribution destination information) by use of HTTP (Hyper Text Transfer Protocol) (step S201).

Sequentially, the document (hereinafter referred to as distribution file) created by the MFP 1 is attached to an e-mail and transmitted to the document management server 5 from the MFP 1 that created the document (step S202).

At this time, when the number of distribution files is two or more, one document is attached to one e-mail and these distribution files may be transmitted to the document management server 5 one by one. Or, multiple documents are attached to one e-mail and these distribution files may be transmitted to the document management server 5.

The document management server 5 periodically inquires of the mail server about the presence or absence of a reception of a new mail, and stores the e-mail with the attachment of the distribution file arrived at the mail server in the file storage section 13.

Then, when normally receiving all distribution files sent from the same user, from the mail server, the document management server 5 stores the received user ID, the transmission destination information, the e-mail transmission request information, distribution file, and the distribution destination information in the management information storage section 114 to be associated with one another as illustrated in FIG. 8B (step S203).

Referring back to FIG. 32, the document management server 5 creates an e-mail with an attachment of a distribution file using an e-mail address described in distribution destination information as an e-mail destination in order to transmit the distribution file to the e-mail address described in distribution destination information (step S204).

Moreover, when the number of distribution files is two or more, e-mail may be created one by one with one distribution file attached to one e-mail. Or, e-mail may be created with all distribution files attached to one e-mail.

Next, when the mail server confirms that preparation for receiving the mail is made, the document management server 5 transmits the distribution file received in step S202 (step S205) and completes mail distribution processing.

Moreover, if the distribution destination information matches a mail address of the user who can share and view the electronic folder and electronic file in the document management server 5 set in the ACL 201 at the time of performing processing in step S205, it is possible to transmit link information, which allows the document to be viewed, without the attachment of the document (distribution file).

Figure 33:
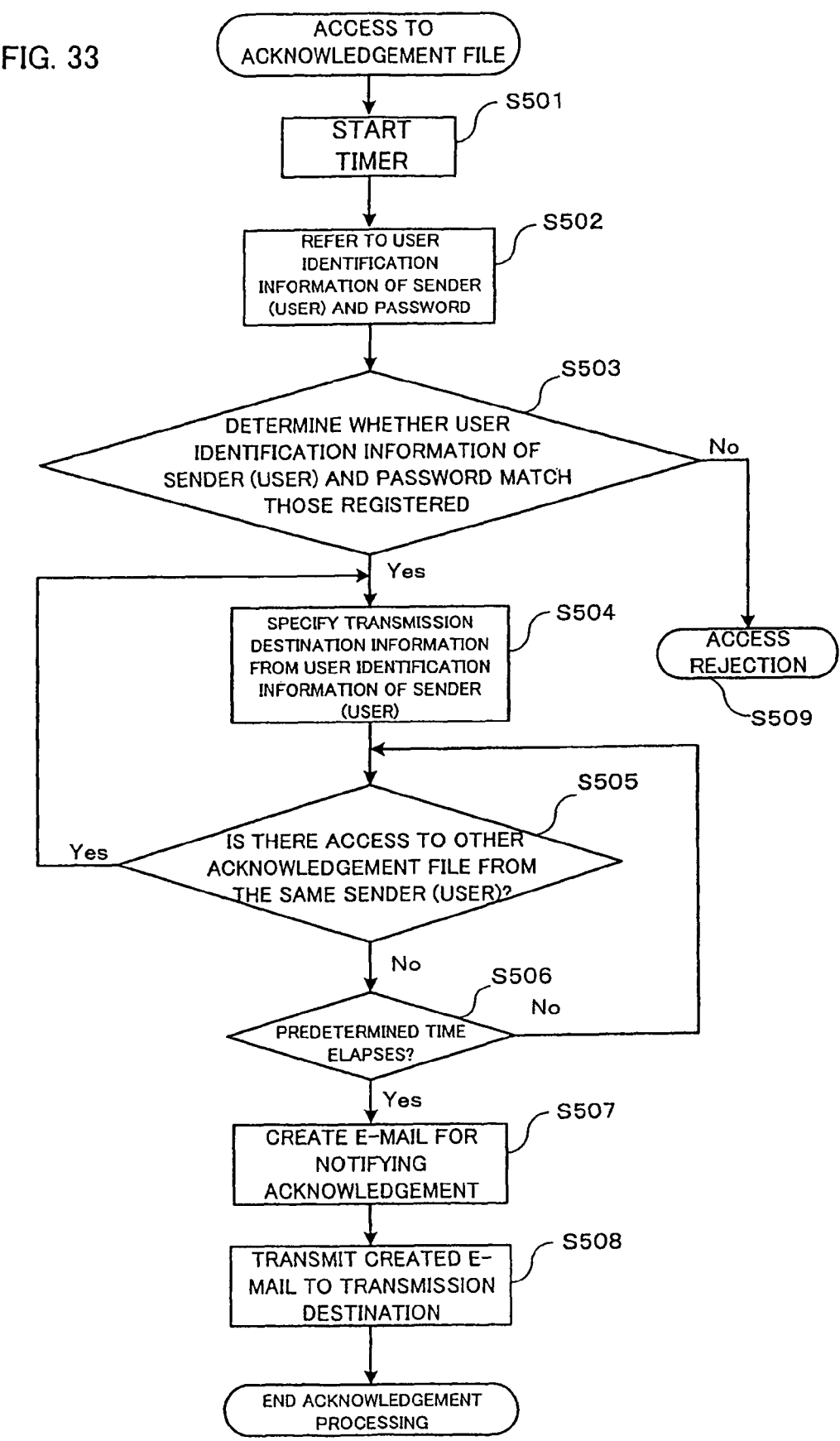
FIG. 33 is a flowchart explaining a "acknowledgement processing" operation.

An explanation will be next given of an operation of the document management server 5, which executes acknowledgement processing according to the "acknowledge" of the present embodiment with reference to a flowchart of FIG. 33.

Figure 35A:
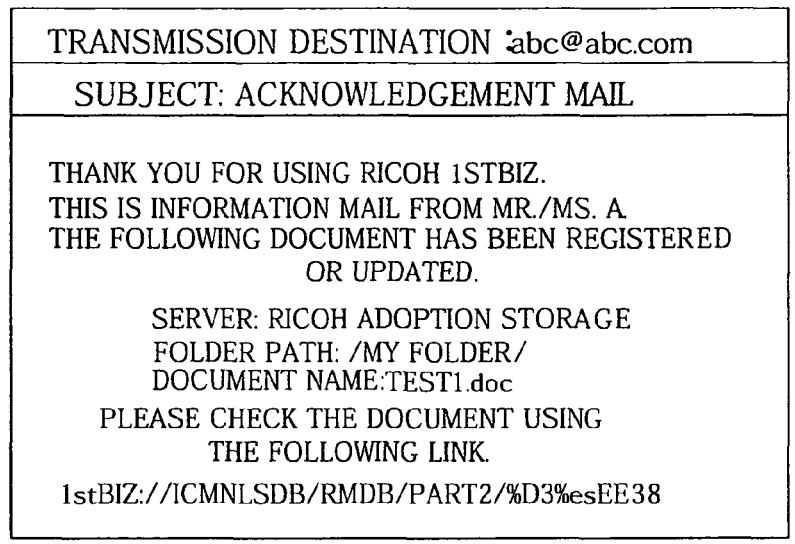
FIGS. 35A and 35B are views each illustrating an example of an acknowledgement mail when notification of registration is sent for each distribution file.
Figure 35B:
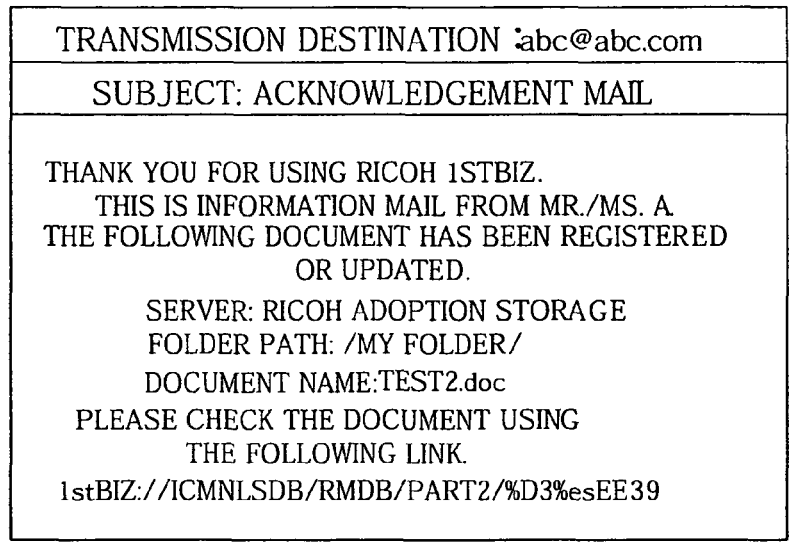

It is possible to add link information to be described later to the distribution mail transmitted by the mail distribution processing. Moreover, when multiple documents are distributed in such a manner that they are attached to one e-mail, link information corresponding to each document is added to one e-mail as illustrated in FIG. 34. Furthermore, when multiple documents are distributed in such a manner that they are attached to the corresponding multiple e-mails, link information corresponding to each document is added to each e-mail as illustrated in FIGS. 35A and 35B. Moreover, the e-mail to which this link information is added may be transmitted to the distribution destination as an e-mail different from the distribution mail.

In the link information, there is described URL (Uniform Resource Locator) indicating a file location on a specific Web server to which a recipient, who has received the distribution mail, can gain access via the network. Additionally, in the link information, there is a description in which the recipient gains access to the URL and transmits information, such as user ID (user identification information) of a sender of the distribution mail and distribution destination information (for example, electronic mail address) that specifies a distribution destination of the distribution mail, simultaneously.

The present embodiment shows that a method for specifying a file using URL is described in the link information. However, this present embodiment also includes a description of a method for specifying a file using, for example, URN (Uniform Resource Name).

Upon detection that the recipient of the distribution mail gains access to a file in the aforementioned link information destination, the document management server 5 starts acknowledgement processing in response to this detection. At this time, the document management server 5 starts an internal timer (step S501).

The Web server connected to the document management server 5 refers to the user ID of the sender of the distribution file sent simultaneously with the access and the distribution destination information that specifies the distribution destination of the distribution mail (step S502).

The document management server 5 determines whether data matching the referenced user ID and distribution destination information are stored in the file storage section 113 (step S503). Then, when there is no matching data (step S503: No), the document management server 5 transmits an instruction, which indicates rejection of access to the file on the Web server, to the Web server connected to the document management server 5 (step S509).

On the other hand, when there is the matching data (step S503: Yes), the document management server 5 specifies an e-mail address of the sender associated with the referenced user ID (step S504).

Next, the document management server 5 determines whether there is access to further another file on the Web server from the user with the same user ID (step S505).

In this case, when there is no access to another file (step S505: No), the document management server 5 repeats determination on the presence or absence of access to another file on the Web server until an elapsed time between the timer starting time in step S501 and the current time exceeds a predetermined elapsed time (step S506). It should be noted that the predetermined elapsed time (for example, several minutes or several hours) here is predetermined. On the other hand, when there is access to another file from the user with the same user ID before the predetermined elapsed time (step S505: Yes), processing is returned to step S504 and the document management server 5 specifies an e-mail address of the sender associated with the user ID of the access (step S504). Afterward, processing in steps S504 and S505 is repeated in the same way.

When the predetermined time elapses in step S506 (step S506: Yes), the document management server 5 uses the e-mail address specified in step S504 as an e-mail destination for notifying acknowledgment and creates an e-mail with an attachment of a document indicating that the recipient of the distribution file has confirmed the reception (step S507). Moreover, the document name transmitted as shown in FIG. 36 is added to the document indicating the confirmation of the reception. At this time, when the number of access is two or more, the document management server 5 adds names of all accessed documents are added to one e-mail.

The document management server 5 transmits this created e-mail to the sender of the distribution file via the mail server (step S508). At this time, the document management server 5 ends the acknowledgement processing upon receiving a signal indicating completion of transmission from the mail server.

As explained above, according to the present invention, it is possible to provide a document management server, document managing method, and program suitable for notifying registration of an electronic file irrespective of access permission.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-250265 filed on Aug. 30, 2005 and Japanese Patent Application No. 2005-250266 filed on Aug. 30, 2005 and including specification, claims, drawings and summary. The disclosure of the above Japanese Patent Applications is incorporated herein by reference in its entirety.

What is claimed is:

1. A computer-implemented document management server comprising:
an electronic file storage section comprising a storage device that stores an electronic file and an electronic folder;
a reception section comprising a network interface device that receives, from an external section via an external network, the electronic file, electronic file location information that designates an electronic folder for storing the electronic file, and destination information that designates a first user of the other party to which registration of the electronic file is notified;
a registration section comprising a processor that identifies the electronic folder indicated by the location information received by the reception section and registers the electronic file received by the reception section by storing the received electronic file in the identified electronic folder;
a first user list storage section comprising a storage device that stores a first user list that associates data designating a user accessible to the electronic file in the electronic folder with data indicating access permission that the user has for each electronic folder or each electronic file stored in the electronic file storage section;
a second user list storage section comprising a storage device that stores a second user list that designates a second user of the other party to be notified, when the user accessible to the electronic folder or the electronic file performs an operation, that the operation is performed, for each electronic folder or each electronic file stored in the electronic file storage section;
a membership list storage section which comprises a storage device that stores a membership list that associates data designating a member with data indicating an e-mail address allocated to the member;
a first transmission section comprising:
a processor that detects registration of the electronic file done by the registration section and identifies from the membership list, in response to detection of the registration of the electronic file, the e-mail address allocated to a user who is designated by the first user list set in the electronic folder that stores the registered electronic file; and
a network interface device that transmits data which represents a notification, indicating that the electronic file received by the reception section is registered by the registration section, to the identified e-mail address allocated to the user;
a second transmission section comprising:
a processor that determines whether or not the first user of the other party designated by the destination information received by the reception section is included in the first user list set in the electronic folder that stores the electronic file registered by the registration section, and identifies, when determined that the first user of the other party is not included, the e-mail address allocated to the first user of the other party from the membership list; and
a network interface device that transmits the data which represents the notification, indicating that the electronic file received by the reception section is registered by the registration section, and the electronic file registered by the registration section to the identified e-mail address which is allocated to the first user of the other party; and
a notification section comprising a network interface device that notifies the second user of the other party, when an operation to the electronic folder or the electronic file stored in the electronic file storage section is performed, that the operation is performed, wherein:
the reception section receives a response from the user to the transmission by the second transmission section, and
the second transmission section transfers, after the reception section receives the response from the user, the data which represents the notification indicating that the electronic file received by the reception section is registered by the registration section, to a transfer destination user who has been registered in advance.

2. The document management server according to claim 1, wherein the second transmission section transmits a notification, indicating that the electronic file received by the reception section is registered in the electronic file storage section, and the electronic file received by the reception section or an electronic file which the second transmission section obtained by converting the electronic file in a predetermined format to the identified e-mail address which is allocated to the first user of the other party indicated by the destination information.

3. The document management server according to claim 1, further comprising:
a second user list storage section comprising a storage device that stores, in association with information designating the first user of the other party, second destination information that designates a second user of the other party to which a notification, indicating a user operation, is sent when the user operation is performed for an electronic file associated with an electronic folder stored in the electronic file storage section;
wherein the reception section receives a response from the first user of the other party; and
wherein the second transmission section determines whether or not information designating the first user of the other party is stored in the second user list storage section and transmits, when determined that the information designating the first user of the other party is stored, a notification, indicating that the electronic file received by the reception section is registered in the electronic file storage section, to the e-mail address allocated to the second user of the other party designated by the second destination information which is in association with the stored information designating the first user of the other party.

4. The document management server according to claim 3, wherein the second transmission section transmits a notification, indicating that the electronic file received by the reception section is registered in the electronic file storage section, and information indicating a location where the electronic file received by the reception section is registered, to the second user of the other party indicated by the second destination information.

5. The document management server according to claim 1, wherein the file transmission section further comprises a processor that reads transmission destination information designating a destination of the electronic file requested to be transmitted from the association storage section, and determines whether or not the user designated by the read transmission destination information is registered in the user list stored in the user list storage section; and
  when it is determined that the user is registered, the file transmission section transmits the electronic file to the e-mail address allocated to the user.

6. The document management server according to claim 1, further comprising:
  a reception completion mail creation section comprising a processor that creates a reception completion mail including information that specifies a transmission destination of the electronic file when the electronic file is transmitted by the file transmission section; and
  a reception completion mail transmission section comprising a network interface device that transmits the reception completion mail created by the reception completion mail creation section to an e-mail address allocated to a notification destination specified by user identification information that designates the sender of the transmitted electronic file.

7. The document management server according to claim 6, wherein the file transmission section further comprises:
  a time measurement section comprising a processor that receives data representing a request for transmitting one of multiple electronic files described in the acknowledgement mail transmitted by the acknowledgment mail transmission section and measures time after the reception; and
  a time elapse determination section comprising a processor that determines whether a predetermined time elapses after receiving the request for transmission of the one electronic file based on time measured by the time measurement section,
  wherein the file transmission section determines whether or not the file transmission section received both data representing a request for transmitting an electronic file different from the one electronic file and user identification information designating the same user as the recipient of the one electronic file before the time elapse determination section determines that predetermined time elapses, and transmits the one electronic file and the different electronic file when it is determined that the file transmission section received both the data representing the request and the user identification information designating the same user as the recipient of the one electronic file before the time elapses; and
  the reception completion mail transmission section transmits one reception completion mail where completion of transmission of the one electronic file and the different electronic file is described.

8. The document management server according to claim 1, wherein the second user list storage section stores the second user list that designates the second user of the other party to be notified, when the user accessible to the electronic folder or the electronic file performs the operation, that the operation is performed, for each kind of the operation to the electronic folder or the electronic file stored in the electronic file storage section.

9. A document managing method comprising:
  the electronic file storage step of storing an electronic file and an electronic folder;
  the reception step of receiving the electronic file, location information that designates an electronic folder for storing the electronic file, and destination information that designates a user of the other party to which registration of the electronic file is notified;
  the registration step of identifying the electronic folder indicated by the location information received in the reception step and registering the electronic file received in the reception step by storing the received electronic file in the identified electronic folder;
  the first user list storage step of storing a first user list that associates data designating a user accessible to the electronic file in the electronic folder with data indicating access permission that the user has for each electronic folder or each electronic file stored in the electronic file storage step;
  the second user list storage step of storing a second user list that designates a second user of the other party to be notified, when the user accessible to the electronic folder or the electronic file performs an operation, that the operation is performed, for each electronic folder or each electronic file stored in the electronic file storage step;
  the membership list storage step of storing a membership list that associates data designating a member with data indicating an e-mail address allocated to the member;
  the first transmission step of:
  detecting registration of the electronic file done in the registration step and identifying from the membership list, in response to detection of the registration of the electronic file, the e-mail address allocated to a user who is designated by the first user list set in the electronic folder that stores the registered electronic file; and
  transmitting data which represents a notification, indicating that the electronic file received in the reception step is registered in the registration step, to the identified e-mail address allocated to the user;
  the second transmission step of:
  determining whether or not the first user of the other party designated by the destination information received in the reception step is included in the first user list set in the electronic folder that stores the electronic file registered in the registration step, and identifying, when determined that the first user of the other party is not included, the e-mail address allocated to the first user of the other party from the membership list; and
  transmitting the data which represents the notification, indicating that the electronic file received in the reception step is registered in the registration step, and the electronic file registered in the registration step to the identified e-mail address which is allocated to the first user of the other party; and
  the notification step of notifying the second user of the other party, when an operation to the electronic folder or the electronic file stored in the electronic file storage step is performed, that the operation is performed, wherein:
  a response from the user to the transmission in the second transmission step is received in the reception step, and the data which represents the notification indicating that the electronic file received in the reception step is registered in the registration step, is transferred, after the response from the user is received in the reception step, to a transfer destination user who has been registered in advance, in the second transmission step.

10. A non-transitory computer-readable recording medium which stores a program causing a computer to function as:

an electronic file storage section comprising a storage device that stores an electronic file and an electronic folder;

a reception section comprising a network interface device that receives, from an external section via an external network, the electronic file, electronic file location information that designates an electronic folder for storing the electronic file, and destination information that designates a first user of the other party to which registration of the electronic file is notified;

a registration section comprising a processor that identifies the electronic folder indicated by the location information received by the reception section and registers the electronic file received by the reception section by storing the received electronic file in the identified electronic folder;

a first user list storage section comprising a storage device that stores a first user list that associates data designating a user accessible to the electronic file in the electronic folder with data indicating access permission that the user has for each electronic folder or each electronic file stored by the electronic file storage section;

a second user list storage section comprising a storage device that stores a second user list that designates a second user of the other party to be notified, when the user accessible to the electronic folder or the electronic file performs an operation, that the operation is performed, for each electronic folder or each electronic file stored in the electronic file storage section;

a membership list storage section which comprises a storage device that stores a membership list that associates data designating a member with data indicating an e-mail address allocated to the member;

a first transmission section comprising:

a processor that detects registration of the electronic file done by the registration section and identifies from the membership list, in response to detection of the registration of the electronic file, the e-mail address allocated to a user who is designated by the first user list set in the electronic folder that stores the registered electronic file; and a network interface device that transmits data which represents a notification, indicating that the electronic file received by the reception section is registered by the registration section, to the identified e-mail address allocated to the user;

a second transmission section comprising:

a processor that determines whether or not the first user of the other party designated by the destination information received by the reception section is included in the first user list set in the electronic folder that stores the electronic file registered by the registration section, and identifies, when determined that the first user of the other party is not included, the e-mail address allocated to the first user of the other party from the membership list; and a network interface device that transmits the data which represents the notification, indicating that the electronic file received by the reception section is registered by the registration section, and the electronic file registered by the registration section to the identified e-mail address which is allocated to the first user of the other party; and a notification section comprising a network interface device that notifies the second user of the other party, when an operation to the electronic folder or the electronic file stored in the electronic file storage section is performed, that the operation is performed, wherein:

the reception section receives a response from the user to the transmission by the second transmission section, and the second transmission section transfers, after the reception section receives the response from the user, the data which represents the notification indicating that the electronic file received by the reception section is registered by the registration section, to a transfer destination user who has been registered in advance.

* * * * *